(12) United States Patent
Comstock, II et al.

(10) Patent No.: US 9,435,689 B2
(45) Date of Patent: Sep. 6, 2016

(54) HYPERSPECTRAL IMAGING SYSTEM, MONOLITHIC SPECTROMETER AND METHODS FOR MANUFACTURING THE MONOLITHIC SPECTROMETER

(71) Applicant: CORNING INCORPORATED, Corning, NY (US)

(72) Inventors: Lovell Elgin Comstock, II, Charlestown, NH (US); Richard Lynton Wiggins, Keene, NH (US)

(73) Assignee: Corning Incorporated, Corning, NY (US)

( * ) Notice: Subject to any disclaimer, the term of this patent is extended or adjusted under 35 U.S.C. 154(b) by 128 days.

(21) Appl. No.: 14/048,518

(22) Filed: Oct. 8, 2013

(65) Prior Publication Data
US 2014/0118738 A1    May 1, 2014

Related U.S. Application Data

(60) Provisional application No. 61/720,658, filed on Oct. 31, 2012.

(51) Int. Cl.
| | |
|---|---|
| *G01J 3/28* | (2006.01) |
| *G01J 3/02* | (2006.01) |
| *G01J 3/18* | (2006.01) |
| *G01J 3/24* | (2006.01) |

(52) U.S. Cl.
CPC .............. *G01J 3/2823* (2013.01); *G01J 3/021* (2013.01); *G01J 3/0208* (2013.01); *G01J 3/0229* (2013.01); *G01J 3/0259* (2013.01); *G01J 3/18* (2013.01); *G01J 3/24* (2013.01); *G01J 2003/2826* (2013.01); *Y10T 29/4998* (2015.01)

(58) Field of Classification Search
CPC ........ G01J 3/2823; G01J 3/0259; G01J 3/02; G01J 3/0256; G01J 3/18; G01J 3/24; G01J 2003/2826
See application file for complete search history.

(56) References Cited

U.S. PATENT DOCUMENTS

| | | | | |
|---|---|---|---|---|
| 3,985,443 A | * | 10/1976 | Danielsson et al. | 356/331 |
| 4,744,618 A | * | 5/1988 | Mahlein | 385/37 |
| 4,799,748 A | * | 1/1989 | Brown | 385/31 |
| 6,303,934 B1 | * | 10/2001 | Daly et al. | 250/339.02 |
| 7,697,137 B2 | | 4/2010 | Comstock, II | |
| 8,390,806 B1 | * | 3/2013 | Subramanian | 356/328 |
| 2002/0060792 A1 | * | 5/2002 | Ibsen et al. | 356/328 |
| 2006/0268269 A1 | * | 11/2006 | Warren | 356/328 |
| 2007/0252989 A1 | | 11/2007 | Comstock | |
| 2010/0103412 A1 | * | 4/2010 | Shibayama | G01J 3/02 356/310 |
| 2010/0315634 A1 | * | 12/2010 | Shibayama | G01J 3/02 356/326 |
| 2012/0105646 A1 | * | 5/2012 | Oster et al. | 348/164 |

FOREIGN PATENT DOCUMENTS

| | | |
|---|---|---|
| WO | 9702475 | 1/1997 |
| WO | 9953350 | 10/1999 |
| WO | 0204901 | 1/2002 |

\* cited by examiner

*Primary Examiner* — Kara E Geisel
*Assistant Examiner* — Violeta A Prieto
(74) *Attorney, Agent, or Firm* — Kevin L. Bray

(57) ABSTRACT

A hyperspectral imaging system, a monolithic Offner spectrometer, and two methods for manufacturing the monolithic Offner spectrometer are described herein. In one embodiment, the monolithic Offner spectrometer comprises a transmissive material which has: (1) an entrance surface which has an opaque material applied thereto, where the opaque material has a portion removed therefrom which forms a slit; (2) a first surface which has a first reflective coating applied thereto to form a first mirror; (3) a second surface which has a second reflective coating applied thereto to form a diffraction grating; (4) a third surface which has a third reflective coating applied thereto to form a second mirror; and (5) an exit surface.

15 Claims, 13 Drawing Sheets

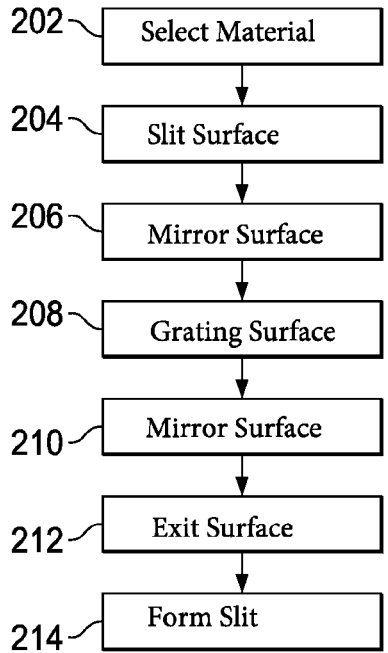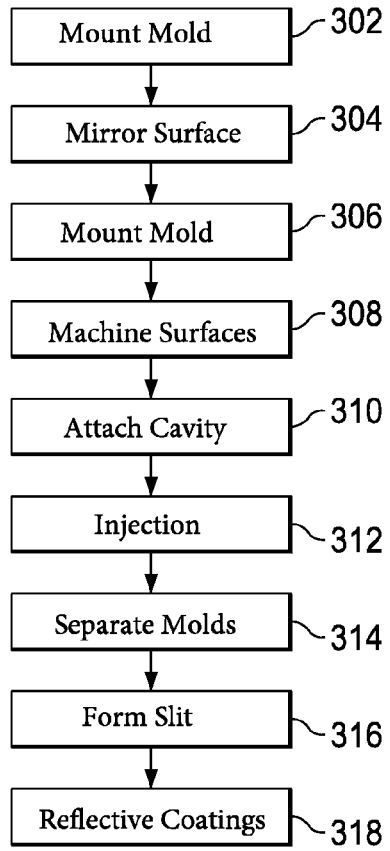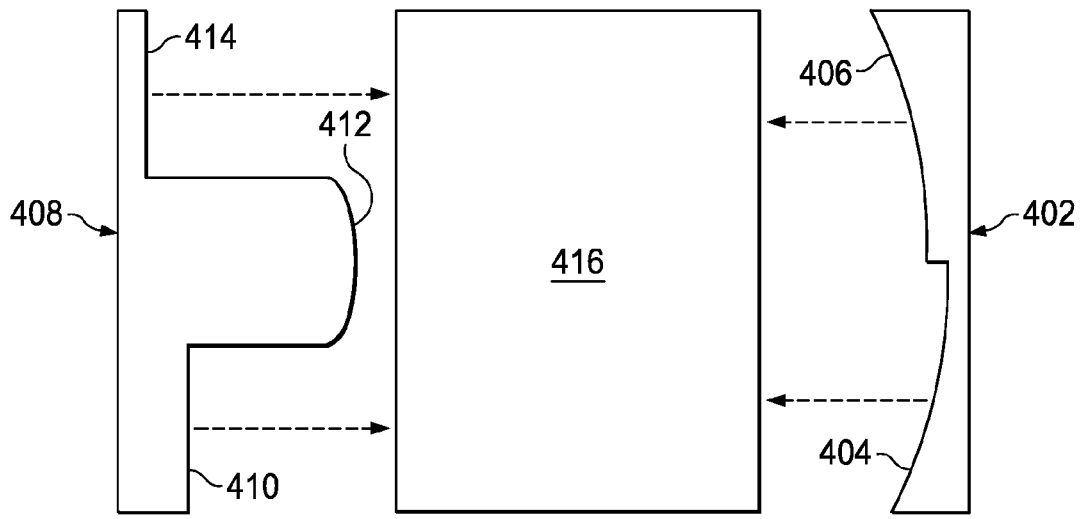

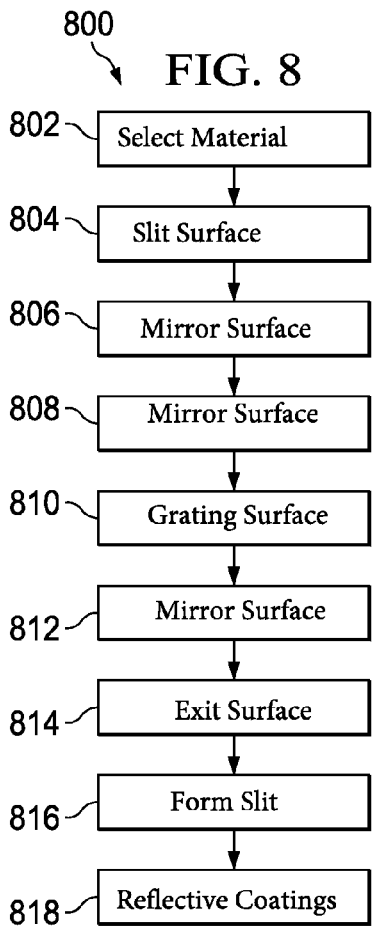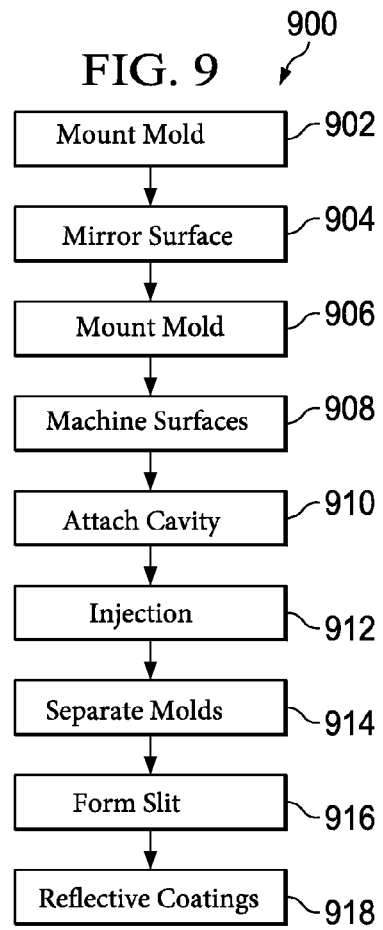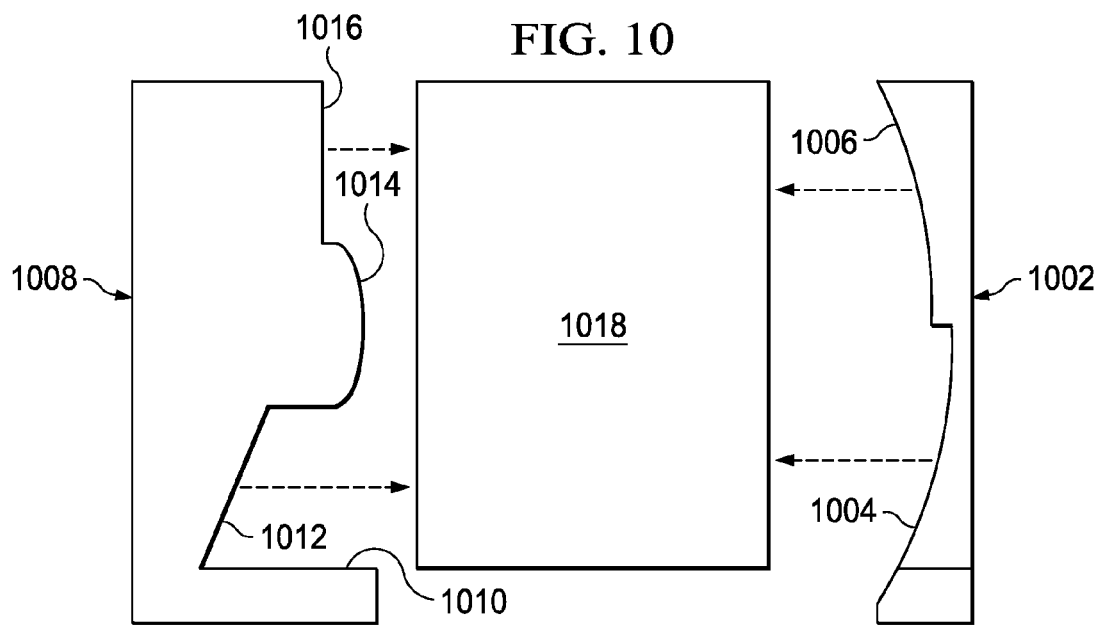

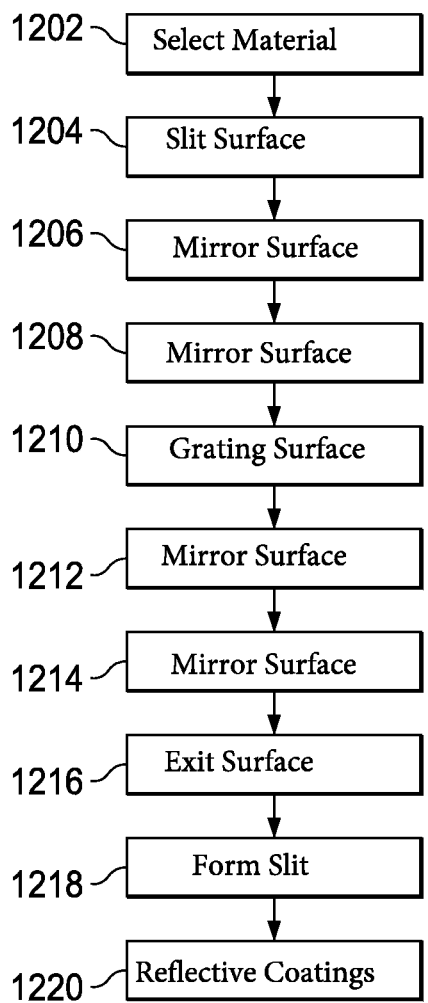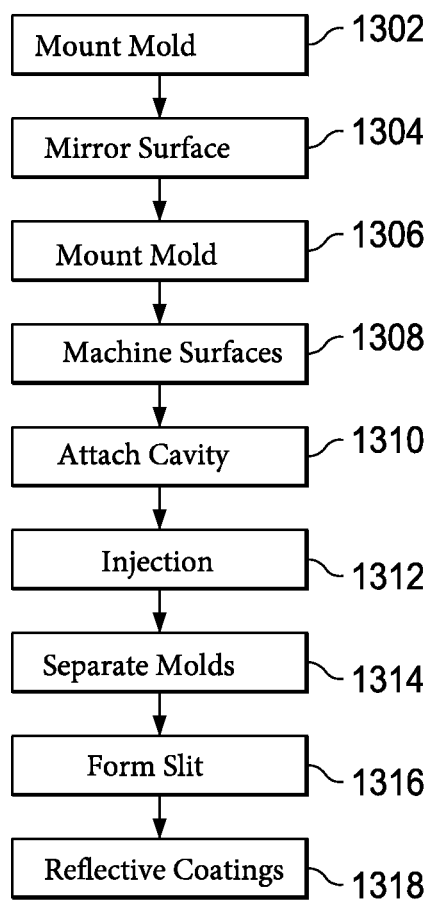

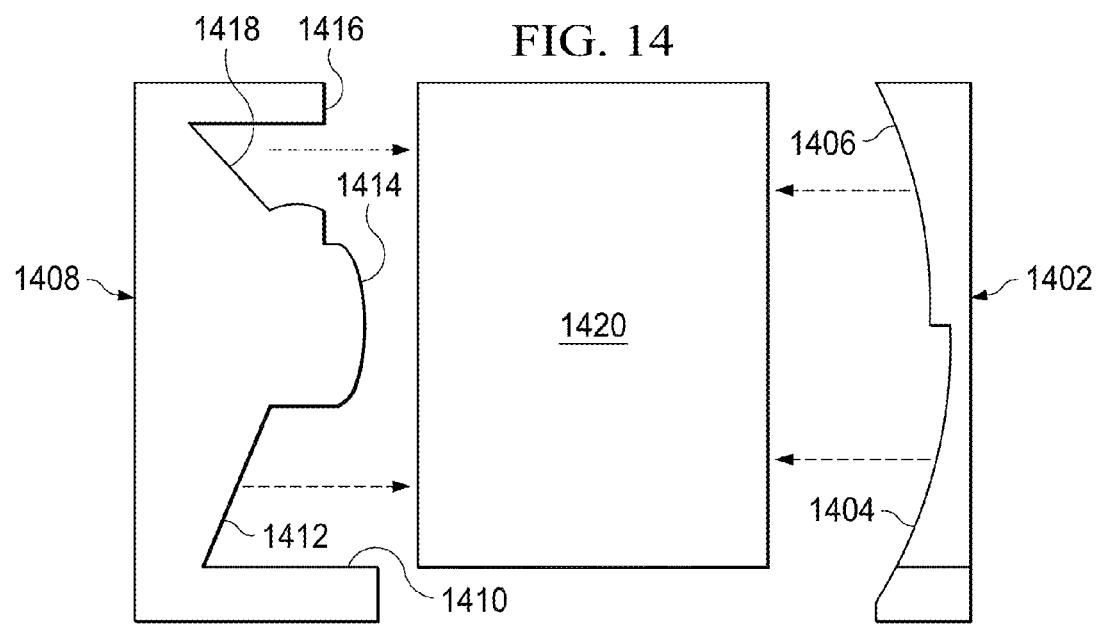

HYPERSPECTRAL IMAGING SYSTEM, MONOLITHIC SPECTROMETER AND METHODS FOR MANUFACTURING THE MONOLITHIC SPECTROMETER

CLAIM OF PRIORITY

This application claims the benefit U.S. Provisional Application Ser. No. 61/720,658 filed on Oct. 31, 2012. The contents of this document are incorporated by reference herein.

TECHNICAL FIELD

The present invention relates to a hyperspectral imaging system, a monolithic Offner spectrometer and two methods for manufacturing the monolithic Offner spectrometer.

BACKGROUND

A spectrometer is a device which receives a light signal as an input and produces as an output a light signal which is spread out, or dispersed, in space according the different wavelength components, or colors, of the input light signal. A detector attached to the spectrometer can analyze the output signal, called the spectrum, to quantify the amount of each wavelength component that is present in the input signal.

A specific type of spectrometer is known as an Offner spectrometer which can be used to produce images of a remote object over a contiguous range of narrow spectral bands. This type of imaging is known as hyperspectral imaging and has recently emerged as an important part of the military/aerospace solution to airborne and spaceborne reconnaissance and remote sensing. Basically, a hyperspectral imaging system which includes fore optics, an Offner spectrometer, a detector, and an advanced data processing technology is able to produce imagery of a scene of interest (remote object) with embedded spectral signature data. This signature data is useful in a wide-variety of applications such as target designation/recognition, missile plume identification and mine detection (for example).

In addition, the hyperspectral imaging system can be used in a wide-variety of commercial applications as well like cancer detection, environmental monitoring, agricultural monitoring and mineral exploration (for example). Because, the hyperspectral imaging system is important to military, aerospace, and commercial industries, manufacturers have been actively trying to develop new and better ways to make and improve the performance of the Offner spectrometer. For instance, the co-assigned U.S. Pat. No. 7,697,137 B2 (the contents of which are incorporated by reference herein) discloses a hyperspectral imaging system that includes a monolithic Offner spectrometer that was an improvement over the traditional Offner spectrometers. Although, the monolithic Offner spectrometer associated with the '137 patent works well in many applications it is still desirable to develop a new monolithic Offner spectrometer. A hyperspectral imaging system that incorporates a new monolithic Offner spectrometer and several methods for manufacturing the new monolithic Offner spectrometer are the subject of the present invention.

SUMMARY

A hyperspectral imaging system, a monolithic Offner spectrometer and two methods for manufacturing the monolithic Offner spectrometer have been described in the independent claims of the present application. Advantageous embodiments of the hyperspectral imaging system, the monolithic Offner spectrometer and the two methods for manufacturing the monolithic Offner spectrometer have been described in the dependent claims.

In one aspect, the present invention provides a hyperspectral imaging system for imaging a remote object. The hyperspectral imaging system comprises: (a) a housing; (b) fore optics, attached to the housing, where the fore optics are configured to receive a beam from the remote object; (c) a detector attached to the housing; and (d) a monolithic Offner spectrometer positioned inside the housing. The monolithic Offner spectrometer comprises: (a) a transmissive material which has: (i) an entrance surface which has an opaque material applied thereto, where the opaque material has an opening therein which forms a slit that is configured for receiving and passing a portion of a beam received from the fore optics; (ii) a first surface which has a first reflective coating applied thereto to form a first mirror, where the first mirror is configured for receiving and reflecting the beam that passed through the slit; (iii) a second surface which has a second reflective coating applied thereto to form a diffraction grating, where the diffraction grating is configured for receiving, diffracting and reflecting the beam received from the first mirror; (iv) a third surface which has a third reflective coating applied thereto to form a second mirror, where the second mirror is configured for receiving and reflecting the diffracted beam received from the diffraction grating; and (v) an exit surface for passing there through the diffracted beam reflected from the second mirror to the detector. If desired, the transmissive material may have a fourth surface which has a fourth reflective coating applied thereto to form a first fold mirror, where the first fold mirror is positioned with respect to the slit and the first mirror so as to receive the beam that passed through the slit and reflect the received beam towards the first mirror. Furthermore, the transmissive material may have a fifth surface which has a fifth reflective coating applied thereto to form a second fold mirror, where the second fold mirror is positioned with respect to the second mirror and the exit surface so as to receive the diffracted beam from the second mirror and reflect the received diffracted beam towards the exit surface.

In another aspect, the present invention provides a monolithic Offner spectrometer. The monolithic Offner spectrometer comprises a transmissive material which has: (i) an entrance surface which has an opaque material applied thereto, where the opaque material has an opening therein which forms a slit configured for receiving and passing a portion of a beam; (ii) a first surface which has a first reflective coating applied thereto to form a first mirror, where the first mirror is configured for receiving and reflecting the beam that passed through the slit; (iii) a second surface which has a second reflective coating applied thereto to form a diffraction grating, where the diffraction grating is configured for receiving, diffracting and reflecting the beam received from the first mirror; (iv) a third surface which has a third reflective coating applied thereto to form a second mirror, where the second mirror is configured for receiving and reflecting the diffracted beam received from the diffraction grating; and (v) an exit surface for passing there through the diffracted beam reflected from the second mirror. If desired, the transmissive material may have a fourth surface which has a fourth reflective coating applied thereto to form a first fold mirror, where the first fold mirror is positioned with respect to the slit and the first mirror so as to receive the beam that passed through the slit and reflect the received beam towards the first mirror. Furthermore, the transmissive material may have a fifth surface which has a fifth reflective coating applied thereto to form a second fold mirror, where the second fold mirror is positioned with respect to the second mirror and the exit surface so as to receive the diffracted beam from the second mirror and reflect the received diffracted beam towards the exit surface.

In another aspect, the present invention provides a method for manufacturing a monolithic Offner spectrometer. The method comprises the steps of: (i) diamond machining a transmissive material to form therein an entrance surface, wherein the entrance surface has a portion on which a slit is formed; (ii) diamond machining the transmissive material to form therein a first surface and then applying a first reflective coating thereto to form a first mirror; (iii) diamond machining the transmissive material to form therein a second surface and then applying a second reflective coating thereto to form a diffraction grating; (iv) diamond machining the transmissive material to form therein a third surface and then applying a third reflective coating thereto to form a second mirror; and (v) diamond machining the transmissive material to form therein an exit surface. If desired, the method may further comprise a step of diamond machining the transmissive material to form therein a fourth surface and then applying a fourth reflective coating thereto to form a first fold mirror. Further, the method may comprise a step of diamond machining the transmissive material to form therein a fifth surface and then applying a fifth reflective coating thereto to form a second fold mirror.

In yet another aspect, the present invention provides a method for providing a hyperspectral image of an area of a remote object. The method comprises the steps of: (i) diamond machining a first mold to form therein mirror images of a first mirror and a second mirror; (ii) diamond machining a second mold to form therein mirror images of an entrance surface, a diffraction grating and an exit surface; (iii) attaching the first mold and the second mold onto opposite ends of a mold cavity; (iv) filling the first mold, the second mold and the mold cavity with a transmissive material; (v) removing the first mold, the second mold and the mold cavity to expose the transmissive material; (vi) forming a slit on an exposed surface of the transmissive material which corresponds to the entrance surface; and (vii) applying a reflective coating to exposed surfaces of the transmissive material to form the first mirror, the diffraction grating and the second mirror. If desired, the method may further comprise steps of diamond machining the second mold to form therein a mirror image of a first fold mirror and applying a reflective coating to an exposed surface of the transmissive material to form the first fold mirror. Furthermore, the method may further comprise steps of diamond machining the second mold to form therein a mirror image of a second fold mirror and applying a reflective coating to an exposed surface of the transmissive material to form the second fold mirror.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIG. 2 is a flowchart that illustrates the steps of an exemplary method for manufacturing a directly machined monolithic Offner spectrometer which can be incorporated in the hyperspectral imaging system shown in FIG. 1 in accordance with an embodiment of the present invention;

FIG. 3 is a flowchart that illustrates the steps of an exemplary method for manufacturing a molded monolithic Offner spectrometer which can be incorporated in the hyperspectral imaging system shown in FIG. 1 in accordance with an embodiment of the present invention;

FIG. 4 is a block diagram that illustrates three molds which can be used to make a molded monolithic Offner spectrometer using the method shown in FIG. 3 in accordance with an embodiment of the present invention;

FIG. 8 is a flowchart that illustrates the steps of an exemplary method for manufacturing a directly machined monolithic Offner spectrometer which can be incorporated in the hyperspectral imaging system shown in FIG. 5 in accordance with an embodiment of the present invention;

FIG. 9 is a flowchart that illustrates the steps of an exemplary method for manufacturing a molded monolithic Offner spectrometer which can be incorporated in the hyperspectral imaging system shown in FIG. 5 in accordance with an embodiment of the present invention;

FIG. 10 is a block diagram that illustrates three molds which can be used to make a molded monolithic Offner spectrometer using the method shown in FIG. 9 in accordance with an embodiment of the present invention;

FIG. 12 is a flowchart that illustrates the steps of an exemplary method for manufacturing a directly machined monolithic Offner spectrometer which can be incorporated in the hyperspectral imaging system shown in FIG. 11 in accordance with an embodiment of the present invention;

FIG. 13 is a flowchart that illustrates the steps of an exemplary method for manufacturing a molded monolithic Offner spectrometer which can be incorporated in the hyperspectral imaging system shown in FIG. 11 in accordance with an embodiment of the present invention;

FIG. 14 is a block diagram that illustrates three molds which can be used to make a molded monolithic Offner spectrometer using the method shown in FIG. 13 in accordance with an embodiment of the present invention;

DETAILED DESCRIPTION

Figure 1:
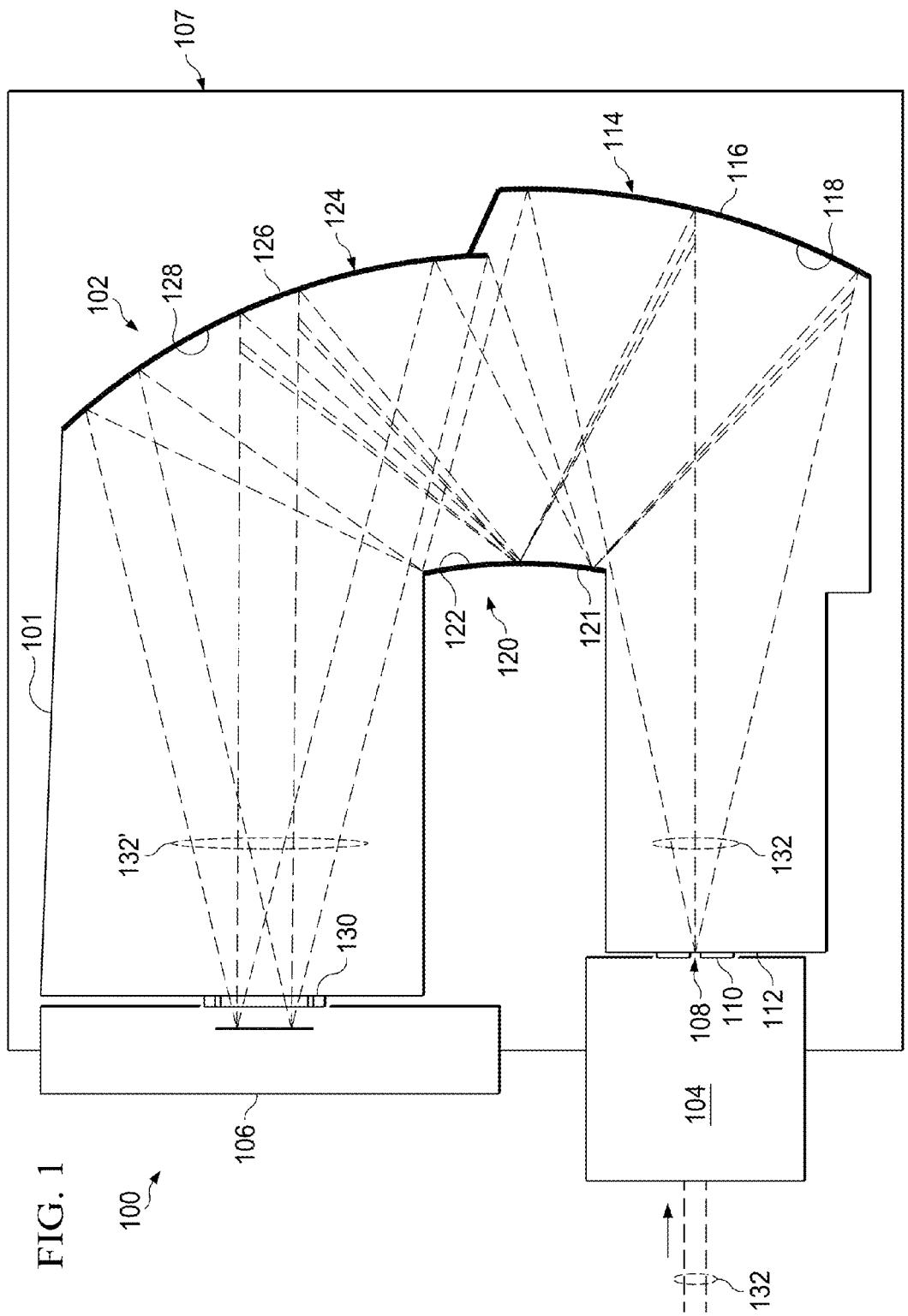
FIG. 1 is a block diagram of a hyperspectral imaging system which incorporates a monolithic Offner spectrometer that is configured in accordance with an embodiment of the present invention.

Referring to FIG. 1, there is a block diagram of an exemplary hyperspectral imaging system 100 which incorporates a monolithic Offner spectrometer 102 that is configured and manufactured in accordance with an embodiment of the present invention. The hyperspectral imaging system 100 has fore optics 104 and a detector 106 both of which directly interface with the monolithic Offner spectrometer 102. The hyperspectral imaging system 100 may also include a housing 107 which protects the monolithic Offner spectrometer 102. For instance, the housing 107 may be a standard detector dewar which not only protects but also functions to insulate the monolithic Offner spectrometer 102.

The monolithic Offner spectrometer 102 is an one-one optical relay made from a single piece of transmissive material 101 including: (1) a slit 108 (e.g., formed when an opaque material 110 is applied to an exposed portion 112/entrance surface 112 of the transmissive material 101 and then the opaque material 110 has a portion removed therefrom to form the slit 108) (e.g., formed when a mask (having same dimension of desired slit 108) is first applied to the entrance surface 112 and then the opaque material 110 is applied to both the exposed entrance surface 112 and the mask and once the mask is removed the slit 108 remains surrounded by the coated entrance surface 112); (2) a first mirror 114 (formed when a reflective coating 116 is applied to an exposed portion 118/first surface 118 of the transmissive material 101); (3) a diffraction grating 120 (formed when a reflective coating 121 is applied to an exposed portion 122/second surface 122 of the transmissive material 101); (4) a second mirror 124 (formed when a reflective coating 126 is applied to an exposed portion 128/third surface 128 of the transmissive material 101); and (5) an exit surface 130. The hyperspectral imaging system 100 can incorporate other components which are well known to those skilled in the art but for clarity only those components 102, 104, 106, 107, 108, 114, 120, and 124 which are needed to explain and enable the present invention will be discussed in detail herein.

The hyperspectral imaging system 100 operates to produce images of a remote object (not shown) over a contiguous range of narrow spectral bands when the fore optics 104 receives a beam 132 (light 132) from the remote object and directs the beam 132 to the monolithic Offner spectrometer 102 which diffracts the beam 132 and forwards the diffracted beam 132' (diffracted light 132') to the detector 106. In particular, the fore optics 104 directs the beam 132 to the slit 108. The first mirror 114 (e.g., spherical mirror 114, toroid mirror 114, toroid aspheric mirror 114, freeform mirror 114) receives the beam 132 which passed through the slit 108 and reflects the beam 132 towards the diffraction grating 120 (e.g., toroidal diffraction grating 120, toroidal aspheric diffraction grating 120). The diffraction grating 120 receives the beam 132 and diffracts and reflects the diffracted beam 132' to the second mirror 124 (e.g., spherical mirror 124, toroidal mirror 124, toroidal aspheric mirror 124, freeform mirror 124). The second mirror 124 receives the diffracted beam 132' and reflects the diffracted beam 132' to the exit surface 130. The detector 106 (e.g., two dimensional focal plane array 106 (FPA 106)) receives and process the diffracted beam 132' which passed through the exit surface 130. The monolithic Offner spectrometer 102 can be manufactured by using one of the two methods 200 and 300 discussed below with respect to FIGS. 2 and 3.

Referring to FIG. 2, there is a flowchart that illustrates the steps of an exemplary method 200 for manufacturing a directly machined monolithic Offner spectrometer 102 in accordance with an embodiment of the present invention. At step 202, the transmissive material 101 which is to be used to form the monolithic Offner spectrometer 102 needs to be selected. The monolithic Offner spectrometer 102 could be made from any type of diamond machinable transmissive (refractive optical) material such as polymethylmethacrylate (PMMA), polystyrene, polycarbonate, silicon, germanium, zinc selinide, zinc sulfide, barium fluoride, silver chloride or arsenic trisulfide (for example). But, there are some factors that can play a role in what type of transmissive material 101 should be selected and these factors include dimensional stability, low surface wavefront errors, low surface roughness, the spectral area of interest for the particular application, the material transmission (absorption) of the transmissive material 101, and the index of refraction of the transmissive material 101.

Once, the transmissive material 101 is selected it is mounted and secured onto a computer numerical control (CNC) diamond turning machine such that a diamond tool can be used to form the monolithic Offner spectrometer 102. At step 204, the diamond tool is used to diamond machine the transmissive material 101 so as to form the entrance surface 112 on a portion of which the slit 108 will be formed (see FIG. 15). At step 206, the diamond tool is used to diamond machine the transmissive material 101 so as to form the exposed portion 118 which will become the first mirror 114. At step 208, the diamond tool is used to diamond machine the transmissive material 101 so as to form the exposed portion 122 which will become the diffraction grating 122 (see FIG. 17). At step 210, the diamond tool is used to diamond machine the transmissive material 101 so as to form the exposed portion 128 which will become the second mirror 124. At step 212, the diamond tool is used to diamond machine the transmissive material 101 so as to form the exit surface 130. Once the diamond machining steps 204, 206, 208, 210 and 212 are completed and these can be completed in any desired order, then step 214 is performed where the slit 108 is formed on a portion of the entrance surface 112. In one example, the slit 108 can be formed by applying the opaque material 110 to the entrance surface 112 and then removing a portion of the opaque material 110 to form the slit 108. In another example, the slit 108 can be formed by applying a mask (having same dimension of desired slit 108) to the entrance surface 112, applying the opaque material 110 to both the exposed entrance surface 112 and the mask, and then removing the mask such that the slit 108 is formed in the coated entrance surface 112. The mask could be a mechanical mask such as, for example, a thin wire. Or, the mask could be applied by using a photo mask and lithography techniques. At step 216, the reflective coatings 116, 121 and 126 are applied to the exposed portions 118, 122, and 128 of the diamond machined transmissive material 101 to form the first mirror 110, the diffraction grating 112 and the second mirror 114. For instance, the opaque material 110 and the reflective coatings 116, 121 and 126 could be applied by using anyone of the vacuum techniques which are commonly used in the optical industry. And, the opaque material 110 and the reflective coatings 116, 121 and 126 could be applied during the same run and can be the same material such as aluminum, gold, silver, or nickel (for example). At this point, a direct machined monolithic Offner spectrometer 102 has been manufactured.

Referring to FIG. 3, there is a flowchart that illustrates the steps of an exemplary method 300 for manufacturing a molded monolithic Offner spectrometer 102 in accordance with an embodiment of the present invention. At step 302, a first mold 402 (which could be made from nickel) is mounted and secured onto a CNC diamond turning machine. A diamond tool is then used to diamond machine the first mold 402 so as to form therein mirror images 404 and 406 which are respectively associated with what are to become the first and second mirrors 114 and 124 (step 304). FIG. 4 is a diagram that illustrates an exemplary first mold 402 which has formed therein the mirror images 404 and 406 that are respectively associated with what are to become the first and second mirrors 110 and 114.

At step 306, a second mold 408 (which could be made from nickel) is mounted and secured onto the CNC diamond turning machine. A diamond tool is then used to diamond machine the second mold 408 so as to form therein mirror images 410, 412 and 414 which are respectively associated with what are to become the entrance surface 112, the diffraction grating 120 and the exit surface 130 (step 308). FIG. 4 is a diagram that illustrates an exemplary second mold 408 which has formed therein the mirror images 410, 412 and 414 that are respectively associated with what are to become the entrance surface 112, the diffraction grating 120 and the exit surface 130.

At step 310, the first mold 402 and the second mold 408 are each connected/attached to opposite ends of a mold cavity 416 (see FIG. 4). At step 312, a transmissive material 101 is poured/injected into a cavity formed within the first mold 402, the second mold 408 and the mold cavity 416. For instance, the step 312 could be part of an injection molding process, a compression molding process or a casting process. The transmissive material 101 can be any type of refractive optical material such as polymethylmethacrylate (PMMA), polystyrene, polycarbonate, silicon, germanium, zinc selinide, zinc sulfide, barium fluoride, silver chloride or arsenic trisulfide (for example). But, there are some factors that can play a role in what type of transmissive material 101 should be selected and these factors include dimensional stability, low surface wavefront errors, low surface roughness, the spectral area of interest for the particular application, the material transmission (absorption) of the transmissive material 101, and the index of refraction of the transmissive material 101.

At step 314, the first mold 402, the second mold 408 and the mold cavity 416 are separated from one another to expose the molded transmissive material 101. Then, step 316 is performed where the slit 108 is formed on a portion of the entrance surface 112. In one example, the slit 108 can be formed by applying the opaque material 110 to the entrance surface 112 and then removing a portion of the opaque material 110 to form the slit 108. In another example, the slit 108 can be formed by applying a mask (having same dimension of desired slit 108) to the entrance surface 112, applying the opaque material 110 to both the exposed entrance surface 112 and the mask, and then removing the mask such that the slit 108 is formed in the coated entrance surface 112. The mask could be a mechanical mask such as, for example, a thin wire. Or, the mask could be applied by using a photo mask and lithography techniques. At step 318, the reflective coatings 116, 121 and 126 are applied to the exposed portions 118, 122, and 128 of the transmissive material 101 to form the first mirror 110, the diffraction grating 112 and the second mirror 114. For instance, the opaque material 110 and the reflective coatings 116, 121 and 126 could be applied by using anyone of the vacuum techniques which are commonly used in the optical industry. And, the opaque material 110 and the reflective coatings 116, 121 and 126 could be applied during the same run and be the same material such as aluminum, gold, silver, or nickel (for example). At this point, a molded monolithic Offner spectrometer 102 has been manufactured.

Figure 5:
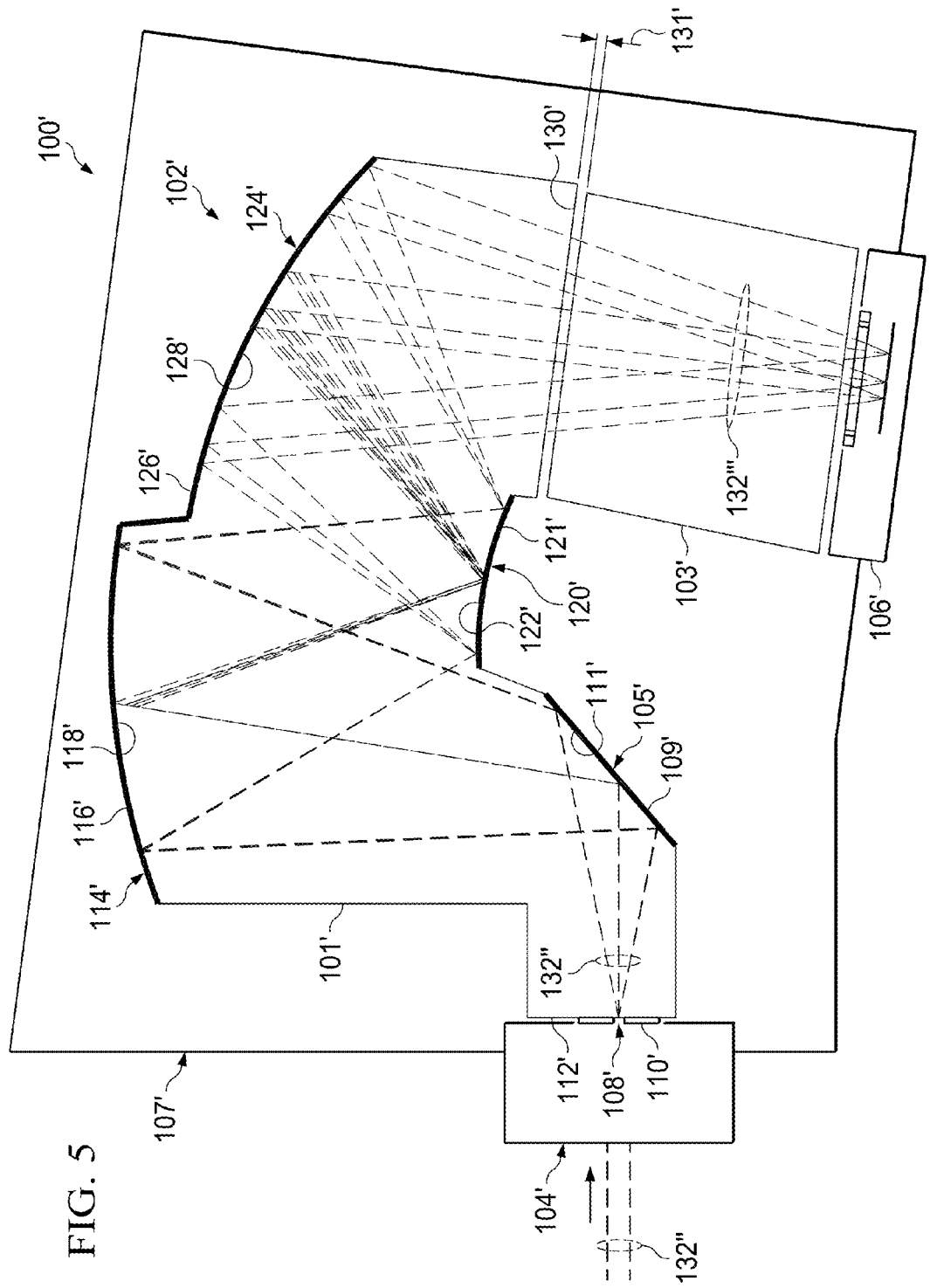
FIG. 5 is a block diagram of an exemplary hyperspectral imaging system which incorporates a monolithic Offner spectrometer that is configured and manufactured in accordance with another embodiment of the present invention.

Referring to FIG. 5, there is a block diagram of an exemplary hyperspectral imaging system 100' which incorporates a monolithic Offner spectrometer 102' that is configured and manufactured in accordance with another embodiment of the present invention. The hyperspectral imaging system 100' has fore optics 104' and a detector 106'. In this example, the fore optics 104' directly interface with the monolithic Offner spectrometer 102'. And, the detector 106' is located a desired distance from the monolithic Offner spectrometer 102' (compare to FIG. 1). As shown, there is a transmissive block 103' which is positioned between the detector 106' and the monolithic Offner spectrometer 102'. There is a space 131' between the transmissive block 103' and the monolithic Offner spectrometer 102' where this space 131' is useful in focusing the detector 106'. The transmissive block 103' could be made of the same material used to make the monolithic Offner spectrometer 102'. Or, the transmissive block 103' could be made of a different material than is used to make the monolithic Offner spectrometer 102'. Alternatively, there may be just empty space and no transmissive block 103' between the detector 106' and the monolithic Offner spectrometer 102'. In yet another alternative, the transmissive material 101' used to make the monolithic Offner spectrometer 102' can be extended so as to take the place of the transmissive material 103' in which case there would be no space 131' as currently shown. The hyperspectral imaging system 100' may also include a housing 107' which protects the monolithic Offner spectrometer 102'. For instance, the housing 107' may be a standard detector dewar which not only protects but also functions to insulate the monolithic Offner spectrometer 102'.

Figure 6:
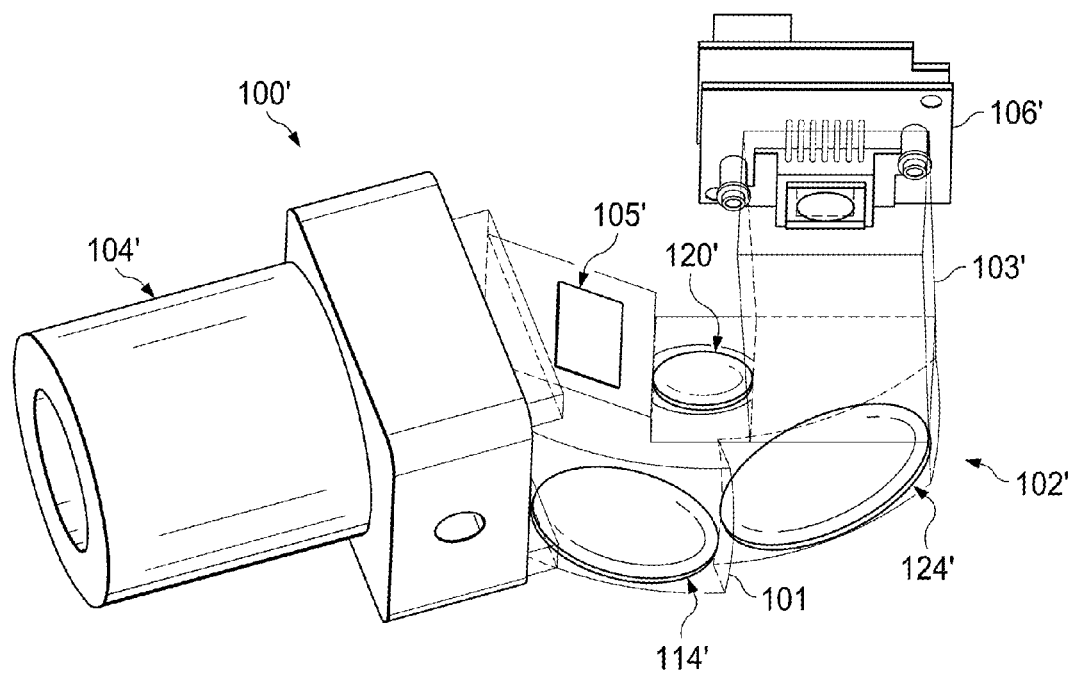
FIG. 6 is a perspective view of the exemplary hyperspectral imaging system shown in FIG. 5 but without the housing as configured in accordance with an embodiment of the present invention.
Figure 7:
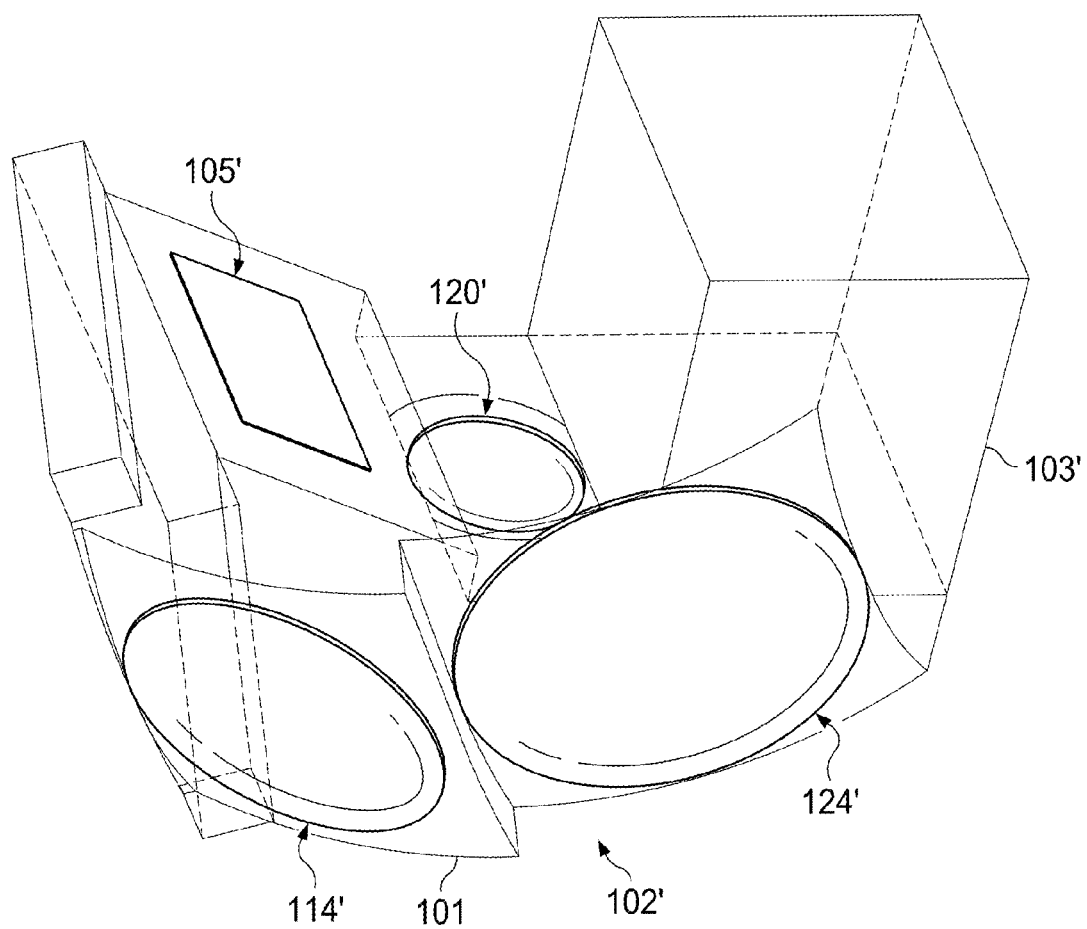
FIG. 7 is a perspective view of the exemplary monolithic Offner spectrometer shown in FIG. 5 configured in accordance with an embodiment of the present invention.

The monolithic Offner spectrometer 102' is an one-one optical relay made from a single piece of transmissive material 101' including: (1) a slit 108' (e.g., formed when an opaque material 110' is applied to an exposed portion 112'/entrance surface 112' of the transmissive material 101' and then the opaque material 110' has a portion removed therefrom to form the slit 108') (e.g., formed when a mask (having same dimension of desired slit 108') is first applied to the entrance surface 112' and then the opaque material 110' is applied to both the exposed entrance surface 112' and the mask and once the mask is removed the slit 108' remains surrounded by the coated entrance surface 112'); (2) a first mirror 114' (formed when a reflective coating 116' is applied to an exposed portion 118'/first surface 118' of the transmissive material 101'); (3) a diffraction grating 120' (formed when a reflective coating 121' is applied to an exposed portion 122'/second surface 122' of the transmissive material 101'); (4) a second mirror 124' (formed when a reflective coating 126' is applied to an exposed portion 128'/third surface 128' of the transmissive material 101'); (5) a fold mirror 105' (formed when a reflective coating 109' is applied to an exposed portion 111'/fourth surface 111' of the transmissive material 101'); and (6) and an exit surface 130'. The hyperspectral imaging system 100' can incorporate other components which are well known to those skilled in the art but for clarity only those components 102', 104', 106', 107', 108', 105', 114', 120', and 124' which are needed to explain and enable the present invention will be discussed in detail herein. FIGS. 6-7 respectively illustrate perspective views of the exemplary hyperspectral imaging system 100' (excluding the housing 107') and the exemplary monolithic Offner spectrometer 102'.

The hyperspectral imaging system 100' operates to produce images of a remote object (not shown) over a contiguous range of narrow spectral bands when the fore optics 104' receives a beam 132" (light 132") from the remote object and directs the beam 132" to the monolithic Offner spectrometer 102' which diffracts the beam 132" and forwards the diffracted beam 132''' (diffracted light 132''') to the detector 106'. In particular, the fore optics 104' directs the beam 132" to the slit 108'. The fold mirror 105' receives the beam 132" which passed through the slit 108' and reflects the beam 132" towards the first mirror 114'. The first mirror 114' (e.g., spherical mirror 114', toroidal mirror 114', toroidal aspheric mirror 114', freeform mirror 114') receives the beam 132" which passed through the slit 108' and reflects the beam 132" towards the diffraction grating 120' (e.g., toroidal diffraction grating 120', toroidal aspheric diffraction grating 120'). The diffraction grating 120' receives the beam 132" and diffracts and reflects the diffracted beam 132''' to the second mirror 124' (e.g., spherical mirror 124', toroidal mirror 124', toroidal aspheric mirror 124', freeform mirror 124'). The second mirror 124' receives the diffracted beam 132''' and reflects the diffracted beam 132''' to the exit surface 130'. The detector 106' (e.g., two dimensional focal plane array 106' (FPA 106')) receives the diffracted beam 132''' which passed through both the exit surface 130' and the transmissive block 103' (if used) and processes the diffracted beam 132'''. The monolithic Offner spectrometer 102' can be manufactured by using one of the two methods 800 and 900 discussed below with respect to FIGS. 8 and 9.

Referring to FIG. 8, there is a flowchart that illustrates the steps of an exemplary method 800 for manufacturing a directly machined monolithic Offner spectrometer 102' in accordance with an embodiment of the present invention. At step 802, the transmissive material 101' which is used to form the monolithic Offner spectrometer 102' needs to be selected. The monolithic Offner spectrometer 102' could be made from any type of diamond machinable transmissive (refractive optical) material such as polymethylmethacrylate (PMMA), polystyrene, polycarbonate, silicon, germanium, zinc selinide, zinc sulfide, barium fluoride, silver chloride or arsenic trisulfide (for example). But, there are some factors that can play a role in what type of transmissive material 101' should be selected and these factors include dimensional stability, low surface wavefront errors, low surface roughness, the spectral area of interest for the particular application, the material transmission (absorption) of the transmissive material 101, and the index of refraction of the transmissive material 101'.

Once, the transmissive material 101' is selected it is mounted and secured onto a computer numerical control (CNC) diamond turning machine such that a diamond tool can be used to form the monolithic Offner spectrometer 102'. At step 804, the diamond tool is used to diamond machine the transmissive material 101' so as to form the entrance surface 112' on a portion of which the slit 108' will be formed (see FIG. 15). At step 806, the diamond tool is used to diamond machine the transmissive material 101' so as to form the exposed portion 111' which will become the fold mirror 105'. At step 808, the diamond tool is used to diamond machine the transmissive material 101' so as to form the exposed portion 118' which will become the first mirror 114'. At step 810, the diamond tool is used to diamond machine the transmissive material 101' so as to form the exposed portion 122' which will become the diffraction grating 122' (see FIG. 17). At step 812, the diamond tool is used to diamond machine the transmissive material 101' so as to form the exposed portion 128' which will become the second mirror 124'. At step 814, the diamond tool is used to diamond machine the transmissive material 101' so as to form the exit surface 130'. Once the diamond machining steps 804, 806, 808, 810, 812 and 814 are completed and these can be completed in any desired order, then step 816 is performed where the slit 108' is formed on a portion of the entrance surface 112'. In one example, the slit 108' can be formed by applying the opaque material 110' to the entrance surface 112' and then removing a portion of the opaque material 110' to form the slit 108'. In another example, the slit 108' can be formed by applying a mask (having same dimension of desired slit 108') to the entrance surface 112', applying the opaque material 110' to both the exposed entrance surface 112' and the mask, and then removing the mask such that the slit 108' is formed in the coated entrance surface 112. The mask could be a mechanical mask such as, for example, a thin wire. Or, the mask could be applied by using a photo mask and lithography techniques. At step 818, the reflective coatings 109', 116', 121' and 126' are applied to the exposed portions 111', 118', 122', and 128' of the diamond machined transmissive material 101 to form the fold mirror 105', the first mirror 110', the diffraction grating 112' and the second mirror 114'. For instance, the opaque material 110' and the reflective coatings 109', 116', 121' and 126' could be applied by using anyone of the vacuum techniques which are commonly used in the optical industry. And, the opaque material 110' and the reflective coatings 109', 116', 121' and 126' could be applied during the same run and be the same material such as aluminum, gold, silver, or nickel (for example). At this point, a direct machined monolithic Offner spectrometer 102' has been manufactured.

Referring to FIG. 9, there is a flowchart that illustrates the steps of an exemplary method 900 for manufacturing a molded monolithic Offner spectrometer 102' in accordance with an embodiment of the present invention. At step 902, a first mold 1002 (which could be made from nickel) is mounted and secured onto a CNC diamond turning machine. A diamond tool is then used to diamond machine the first mold 1002 so as to form therein mirror images 1004 and 1006 which are respectively associated with what are to become the first and second mirrors 114' and 124' (step 904). FIG. 10 is a diagram that illustrates an exemplary first mold 1002 which has formed therein the mirror images 1004 and 1006 that are respectively associated with what are to become the first and second mirrors 110' and 114'.

At step 906, a second mold 1008 (which could be made from nickel) is mounted and secured onto the CNC diamond turning machine. A diamond tool is then used to diamond machine the second mold 1008 so as to form therein mirror images 1010, 1012, 1014 and 1016 which are respectively associated with what are to become the entrance surface 112', the fold mirror 105', the diffraction grating 120' and the exit surface 130' (step 908). FIG. 10 is a diagram that illustrates an exemplary second mold 1008 which has formed therein the mirror images 110, 1012, 1014 and 1016 that are respectively associated with what are to become the entrance surface 112', the fold mirror 105', the diffraction grating 120' and the exit surface 130'.

At step 910, the first mold 1002 and the second mold 1008 are each connected/attached to opposite ends of a mold cavity 1018 (see FIG. 10). At step 912, a transmissive material 101' is poured/injected into a cavity formed within the first mold 1002, the second mold 1008 and the mold cavity 1018. For instance, the step 912 could be part of an injection molding process, a compression molding process or a casting process. The transmissive material 101' can be any type of refractive optical material such as polymethyl-methacrylate (PMMA), polystyrene, polycarbonate, silicon, germanium, zinc selinide, zinc sulfide, barium fluoride, silver chloride or arsenic trisulfide (for example). But, there are some factors that can play a role in what type of transmissive material 101' should be selected and these factors include dimensional stability, low surface wave-front errors, low surface roughness, spectral area of interest for the particular application, the material transmission (absorption) of the transmissive material 101, and the index of refraction of the transmissive material 101'.

At step 914, the first mold 1002, the second mold 1008 and the mold cavity 1018 are separated from one another to expose the molded transmissive material 101'. Then, step 916 is performed where the slit 108' is formed on a portion of the entrance surface 112'. In one example, the slit 108' can be formed by applying the opaque material 110' to the entrance surface 112' and then removing a portion of the opaque material 110' to form the slit 108'. In another example, the slit 108' can be formed by applying a mask (having same dimension of desired slit 108') to the entrance surface 112', applying the opaque material 110' to both the exposed entrance surface 112' and the mask, and then removing the mask such that the slit 108' is formed in the coated entrance surface 112'. The mask could be a mechanical mask such as, for example, a thin wire. Or, the mask could be applied by using a photo mask and lithography techniques. At step 918, the reflective coatings 109', 116', 121' and 126' are applied to the exposed portions 111', 118', 122', and 128' of the transmissive material 101' to form the fold mirror 105', the first mirror 110', the diffraction grating 112' and the second mirror 114'. For instance, the opaque material 110' and the reflective coatings 109', 116', 121' and 126' could be applied by using anyone of the vacuum techniques which are commonly used in the optical industry. And, the opaque material 110' and the reflective coatings 109', 116', 121' and 126' could be applied during the same run and be the same material such as aluminum, gold, silver, or nickel (for example). At this point, a molded monolithic Offner spectrometer 102' has been manufactured.

Figure 11:
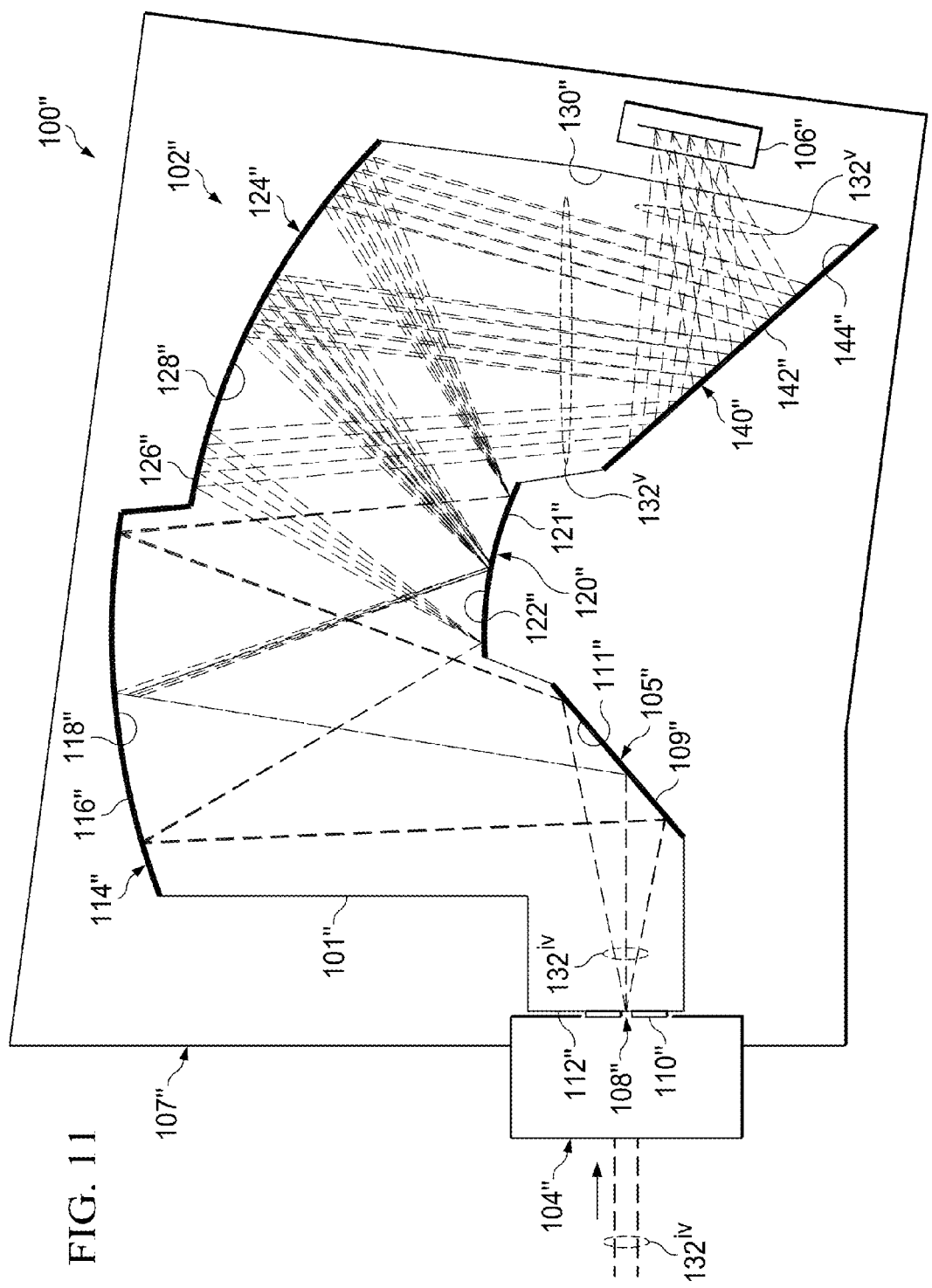
FIG. 11 is a block diagram of an exemplary hyperspectral imaging system which incorporates a monolithic Offner spectrometer that is configured and manufactured in accordance with yet another embodiment of the present invention.

Referring to FIG. 11, there is a block diagram of an exemplary hyperspectral imaging system 100" which incorporates a monolithic Offner spectrometer 102" that is configured and manufactured in accordance with yet another embodiment of the present invention. The hyperspectral imaging system 100" has fore optics 104" and a detector 106". In this example, the fore optics 104" directly interface with the monolithic Offner spectrometer 102". And, the detector 106" is located a desired distance from the monolithic Offner spectrometer 102" (compare to FIGS. 1 and 5). The hyperspectral imaging system 100" may also include a housing 107" which protects the monolithic Offner spectrometer 102". For instance, the housing 107" may be a standard detector dewar which not only protects but also functions to insulate the monolithic Offner spectrometer 102".

The monolithic Offner spectrometer 102" is an one-one optical relay made from a single piece of transmissive material 101" including: (1) a slit 108" (e.g., formed when an opaque material 110" is applied to an exposed portion 112"/entrance surface 112" of the transmissive material 101" and then the opaque material 110" has a portion removed therefrom to form the slit 108") (e.g., formed when a mask (having same dimension of desired slit 108") is first applied to the entrance surface 112" and then the opaque material 110" is applied to both the exposed entrance surface 112" and the mask and once the mask is removed the slit 108" remains surrounded by the coated entrance surface 112"); (2) a first mirror 114" (formed when a reflective coating 116" is applied to an exposed portion 118 "/first surface 118" of the transmissive material 101"); (3) a diffraction grating 120" (formed when a reflective coating 121' is applied to an exposed portion 122"/second surface 122" of the transmissive material 101"); (4) a second mirror 124" (formed when a reflective coating 126" is applied to an exposed portion 128"/third surface 128" of the transmissive material 101"); (5) a first fold mirror 105" (formed when a reflective coating 109" is applied to an exposed portion 111 "/fourth surface 111" of the transmissive material 101"); (6) a second fold mirror 140" (formed when a reflective coating 142" is applied to an exposed portion 144"/fifth surface 144" of the transmissive material 101"); and (6) and an exit surface 130'. The hyperspectral imaging system 100" can incorporate other components which are well known to those skilled in the art but for clarity only those components 102", 104", 106", 107', 108", 105', 114", 120", 124" and 140" which are needed to explain and enable the present invention will be discussed in detail herein.

The hyperspectral imaging system 100" operates to produce images of a remote object (not shown) over a contiguous range of narrow spectral bands when the fore optics 104" receives a beam $132^{iv}$ (light $132^{iv}$) from the remote object and directs the beam $132^{iv}$ to the monolithic Offner spectrometer 102" which diffracts the beam $132^{iv}$ and forwards the diffracted beam $132^v$ (diffracted light $132^v$) to the detector 106". In particular, the fore optics 104" directs the beam $132^{iv}$ to the slit 108". The first fold mirror 105" receives the beam $132^{iv}$ which passed through the slit 108" and reflects the beam $132^{iv}$ towards the first mirror 114". The first mirror 114" (e.g., spherical mirror 114", toroidal mirror 114", toroidal aspheric mirror 114", freeform mirror 114") receives the beam $132^{iv}$ which passed through the slit 108" and reflects the beam $132^{iv}$ towards the diffraction grating 120" (e.g., toroidal diffraction grating 120", toroidal aspheric diffraction grating 120"). The diffraction grating 120" receives the beam $132^{iv}$ and diffracts and reflects the diffracted beam $132^v$ to the second mirror 124" (e.g., spherical mirror 124", toroidal mirror 124", toroidal aspheric mirror 124", freeformn mirror 124"). The second mirror 124" receives the diffracted beam $132^v$ and reflects the diffracted beam $132^v$ to the second fold mirror 140". The second fold mirror 140" then reflects the diffracted beam $132^v$ to the exit surface 130". The detector 106" (e.g., two dimensional focal plane array 106" (FPA 106")) receives the diffracted beam $132^v$ which passed through the exit surface 130" and processes the diffracted beam $132^v$. The monolithic Offner spectrometer 102" can be manufactured by using one of the two methods 1200 and 1300 discussed below with respect to FIGS. 12 and 13

Referring to FIG. 12, there is a flowchart that illustrates the steps of an exemplary method 1200 for manufacturing a directly machined monolithic Offner spectrometer 102" in accordance with an embodiment of the present invention. At step 1202, the transmissive material 101" which is used to form the monolithic Offner spectrometer 102" needs to be selected. The monolithic Offner spectrometer 102" could be made from any type of diamond machinable transmissive (refractive optical) material such as polymethylmethacrylate (PMMA), polystyrene, polycarbonate, silicon, germanium, zinc selinide, zinc sulfide, barium fluoride, silver chloride or arsenic trisulfide (for example). But, there are some factors that can play a role in what type of transmissive material 101" should be selected and these factors include dimensional stability, low surface wavefront errors, low surface roughness, the spectral area of interest for the particular application, the material transmission (absorption) of the transmissive material 101, and the index of refraction of the transmissive material 101".

Once, the transmissive material 101" is selected it is mounted and secured onto a computer numerical control (CNC) diamond turning machine such that a diamond tool can be used to form the monolithic Offner spectrometer 102". At step 1204, the diamond tool is used to diamond machine the transmissive material 101" so as to form the entrance surface 112" on a portion of which the slit 108" is formed (see FIG. 15). At step 1206, the diamond tool is used to diamond machine the transmissive material 101" so as to form the exposed portion 111" which will become the first fold mirror 105". At step 1208, the diamond tool is used to diamond machine the transmissive material 101" so as to form the exposed portion 118" which will become the first mirror 114". At step 1210, the diamond tool is used to diamond machine the transmissive material 101" so as to form the exposed portion 122" which will become the diffraction grating 122" (see FIG. 17). At step 1212, the diamond tool is used to diamond machine the transmissive material 101" so as to form the exposed portion 128" which will become the second mirror 124". At step 1214, the diamond tool is used to diamond machine the transmissive material 101" so as to form the exposed portion 144" which will become the second fold mirror 140". At step 1216, the diamond tool is used to diamond machine the transmissive material 101" so as to form the exit surface 130". Once the diamond machining steps 1204, 1206, 1208, 1210, 1212, 1214 and 1216 are completed and these can be completed in any desired order, then step 1218 is performed where the slit 108" is formed on a portion of the entrance surface 112". In one example, the slit 108" can be formed by applying the opaque material 110" to the entrance surface 112" and then removing a portion of the opaque material 110" to form the slit 108". In another example, the slit 108" can be formed by applying a mask (having same dimension of desired slit 108") to the entrance surface 112", applying the opaque material 110" to both the exposed entrance surface 112" and the mask, and then removing the mask such that the slit 108" is formed in the coated entrance surface 112". The mask could be a mechanical mask such as, for example, a thin wire. Or, the mask could be applied by using a photo mask and lithography techniques. At step 1220, the reflective coatings 109", 116", 121", 126" and 142" are applied to the exposed portions 111", 118", 122", 128" and 144" of the diamond machined transmissive material 101 to form the first fold mirror 105", the first mirror 110", the diffraction grating 112", the second mirror 114", and the second fold mirror 140". For instance, the opaque material 110" and the reflective coatings 109', 116", 121", 126" and 142" could be applied by using anyone of the vacuum techniques which are commonly used in the optical industry. And, the opaque material 110" and the reflective coatings 109', 116", 121", 126" and 142" could be applied during the same run and be the same material such as aluminum, gold, silver, or nickel (for example). At this point, a direct machined monolithic Offner spectrometer 102" has been manufactured.

Referring to FIG. 13, there is a flowchart that illustrates the steps of an exemplary method 1300 for manufacturing a molded monolithic Offner spectrometer 102" in accordance with an embodiment of the present invention. At step 1302, a first mold 1402 (which could be made from nickel) is mounted and secured onto a CNC diamond turning machine. A diamond tool is then used to diamond machine the first mold 1402 so as to form therein mirror images 1404 and 1406 which are respectively associated with what are to become the first and second mirrors 114" and 124" (step 1304). FIG. 14 is a diagram that illustrates an exemplary first mold 1402 which has formed therein the mirror images 1404 and 1406 that are respectively associated with what are to become the first and second mirrors 110" and 114".

At step 1306, a second mold 1408 (which could be made from nickel) is mounted and secured onto the CNC diamond turning machine. A diamond tool is then used to diamond machine the second mold 1408 so as to form therein mirror images 1410, 1412, 1414, 1416 and 1418 which are respectively associated with what are to become the entrance surface 112", the first fold mirror 105", the diffraction grating 120", the exit surface 130", and the second fold mirror 140" (step 1308). FIG. 14 is a diagram that illustrates an exemplary second mold 1408 which has formed therein the mirror images 110, 1012, 1014 and 1016 that are respectively associated with what are to become the entrance surface 112", the first fold mirror 105", the diffraction grating 120", the exit surface 130", and the second fold mirror 140".

At step 1310, the first mold 1402 and the second mold 1408 are each connected/attached to opposite ends of a mold cavity 1420 (see FIG. 14). At step 1312, a transmissive material 101" is poured/injected into a cavity formed within the first mold 1402, the second mold 1408 and the mold cavity 1420. For instance, the step 1312 could be part of an injection molding process, a compression molding process or a casting process. The transmissive material 101" can be any type of refractive optical material such as polymethylmethacrylate (PMMA), polystyrene, polycarbonate, silicon, germanium, zinc selinide, zinc sulfide, barium fluoride, silver chloride or arsenic trisulfide (for example). But, there are some factors that can play a role in what type of transmissive material 101" should be selected and these factors include dimensional stabilitity, low surface wavefront errors, low surface roughness, spectral area of interest for the particular application, the material transmission (absorption) of the transmissive material 101", and the index of refraction of the transmissive material 101".

At step 1314, the first mold 1402, the second mold 1408 and the mold cavity 1420 are separated from one another to expose the molded transmissive material 101". Then, step 1316 is performed where the slit 108" is formed on a portion of the entrance surface 112". In one example, the slit 108" can be formed by applying the opaque material 110" to the entrance surface 112" and then removing a portion of the opaque material 110" to form the slit 108". In another example, the slit 108" can be formed by applying a mask (having same dimension of desired slit 108) to the entrance surface 112", applying the opaque material 110" to both the exposed entrance surface 112" and the mask, and then removing the mask such that the slit 108" is formed in the coated entrance surface 112". The mask could be a mechanical mask such as, for example, a thin wire. Or, the mask could be applied by using a photo mask and lithography techniques. At step 1318, the reflective coatings 109", 116", 121", 126" and 142" are applied to the exposed portions 111", 118", 122", 128" and 144" of the transmissive material 101 to form the first fold mirror 105", the first mirror 110", the diffraction grating 112", the second mirror 114", and the second fold mirror 140". For instance, the opaque material 110" and the reflective coatings 109', 116", 121", 126" and 142" could be applied by using anyone of the vacuum techniques which are commonly used in the optical industry. And, the opaque material 110" and the reflective coatings 109', 116", 121", 126" and 142" could be applied during the same run and be the same material such as aluminum, gold, silver, or nickel (for example). At this point, the molded monolithic Offner spectrometer 102" has been manufactured.

The hyperspectral imaging system 100/100'/100" and the corresponding monolithic Offner spectrometer 102/102'/102" described above have several components and a desirable compact configuration (e.g., focal length, linear dispersion) which are discussed in greater detail next:

I. The slit 108/108'/108".

II. The first mirror 114/114'/114" and the second mirror 124/124'/124".

III. The diffraction grating 120/120'/120".

IV. The transmissive material 101/101'/101".

V. The compact configuration of the monolithic Offner spectrometer 102/102'/102".

VI. The housing 107/107'/107".

I. The Slit 108/108'/108"

The hyperspectral imaging system described in the aforementioned '137 patent had a slit which was located in the housing and was physically separated from the monolithic Offner spectrometer. In contrast, the hyperspectral imaging system 100/100'/100" has a slit 108/108'/108" which is formed directly on the entrance surface 112/112'/112" of the monolithic Offner spectrometer 102/102'/102". In one example, the slit 108/108'/108" is formed by depositing the opaque material 110/110'/110" onto the entrance surface 112/112'/112" of the transmissive material 101/101'/101" and then machining an opening in the opaque material 110/110'/110" that had been deposited onto the entrance surface 112/112'/112" of the transmissive material 101/101'/101". In another example, the slit 108/108'/108" is formed by first applying a mask (having same dimension of desired slit 108/108'/108") to the entrance surface 112/112'/112" and then the opaque material 110/110'/110" is applied to both the exposed entrance surface 112/112'/112" and the mask and when the mask is removed then the slit 108/108'/108" remains surrounded by the coated entrance surface 112/112'/112". The mask could be a mechanical mask such as, for example, a thin wire. Or, the mask could be applied by using a photo mask and lithography techniques. As can be appreciated, the slit 108/108'/108" can be created by anyone of a number of processes. If desired, the opaque material 110/110'/110" can be the same material (e.g., aluminum, gold, silver, or nickel) as the reflective coatings 109', 116"/116'/116", 121"/121'/121", 126/126'/126" and 142" which respectively form the first fold mirror 105' (if used), the first mirror 114/114'/114", the diffraction grating 120/120'/120", the second mirror 124/124'/124", and the second fold mirror 140" (if used). Plus, the opaque material 110/110'/110" can be deposited onto the transmissive material 101/101'/101" at the same time the reflective coatings 109', 116/116'/116", 121/121'/121", 126/126'/126" and 142" which respectively form the first fold mirror 105' (if used), the first mirror 114/114'/114", the diffraction grating 120/120'/120", the second mirror 124/124'/124", and the second fold mirror 140" (if used) are deposited onto the transmissive material 101/101'/101". In this manner, manufacturing efficiency is improved by performing a single optical coating run on the transmissive material 101/101'/101".

Figure 15:
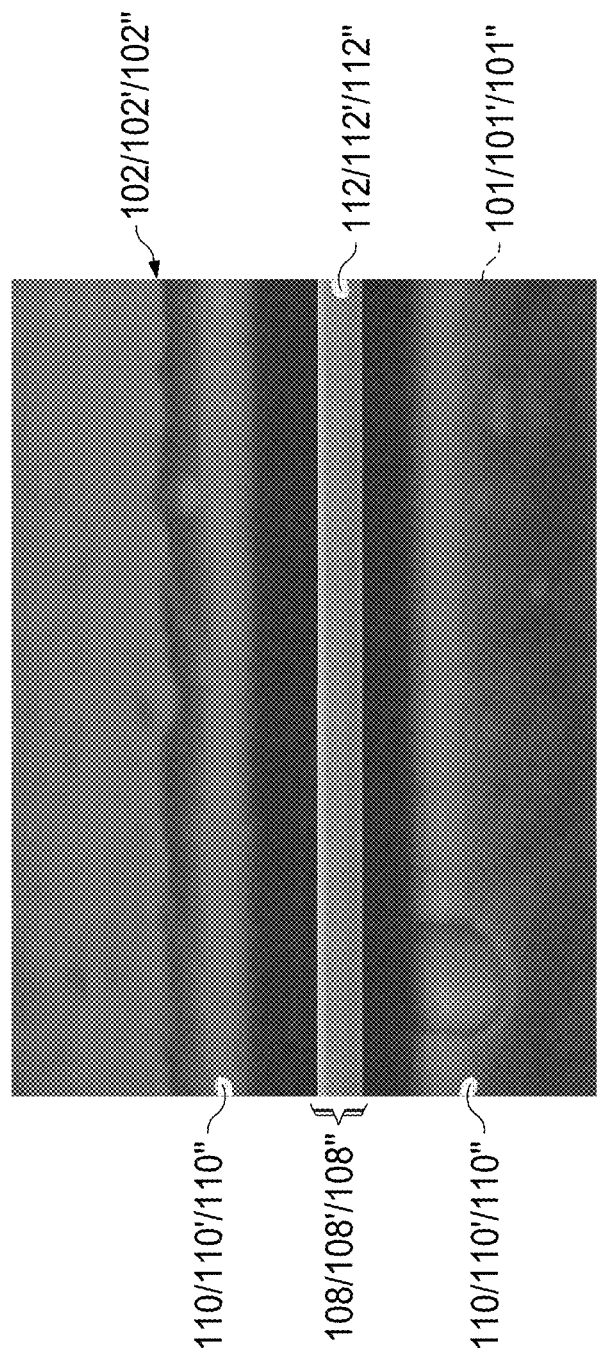
FIG. 15 is an image (magnified 374x) of an exemplary slit formed on the monolithic Offner spectrometers shown in FIGS. 1, 5 and 11 in accordance with an embodiment of the present invention.

Referring to FIG. 15, there is an image (magnified 374×) of an exemplary slit 108/108'/108" formed on the monolithic Offner spectrometer 102/102'/102" in accordance with an embodiment of the present invention. In this example, the opaque material 110/110'/110" was a thin layer of Aluminum which was deposited on the entrance surface 112/112'/112" of the transmissive material 101/101'/101". A diamond machining process was then used to machine a "slot" through the opaque material 110/110'/110" (Aluminum) to form the slit 108/108'/108" which then enables the beam 132/132"/132" to pass there through and into the transmissive material 101/101'/101" within which the beam 132/132"/132"$^{iv}$ is diffracted and the diffracted beam 132'/132"'/132$^v$ is directed to the detector 106/106'/106" (see FIGS. 1, 5 and 11). The exemplary slit 108/108'/108" shown is 20 μm wide and 8 mm long.

II. The First Mirror 114/114'/114" and the Second Mirror 124/124'/124".

The monolithic Offner spectrometer 102/102'/102" can have first and second mirrors 114/114'/114" and 124/124'/124" which are spherical mirrors, toroidal mirrors (for aberration correction), toroidal aspheric mirrors (for aberration correction), or freeform mirrors. For instance, the first and second mirrors 114/114'/114" and 124/124'/124" may both be toroidal mirrors or toroidal aspheric mirrors. Or, the first mirror 114/114'/114" may be a toroidal mirror and the second mirror 124/124'/124" may be a toroidal aspheric mirror. Alternatively, the first mirror 114/114'/114" may be a toroidal aspheric mirror and the second mirror 124/124'/124" may be a toroidal mirror. The use of toroidal mirrors 114/114'/114" and 124/124'/124" (or toroidal aspheric mirrors 114/114'/114" and 124/124'/124") in monolithic spectrometers has not been used in the past because of fabrication difficulties.

However, the monolithic Offner spectrometer 102/102'/102" with the aid of a diamond machining process is able to utilize toroidal mirrors 114/114'/114" and 124/124'/124" (or toroidal aspheric mirrors 114/114'/114" and 124/124'/124") without additional manufacturing cost.

Figure 16:
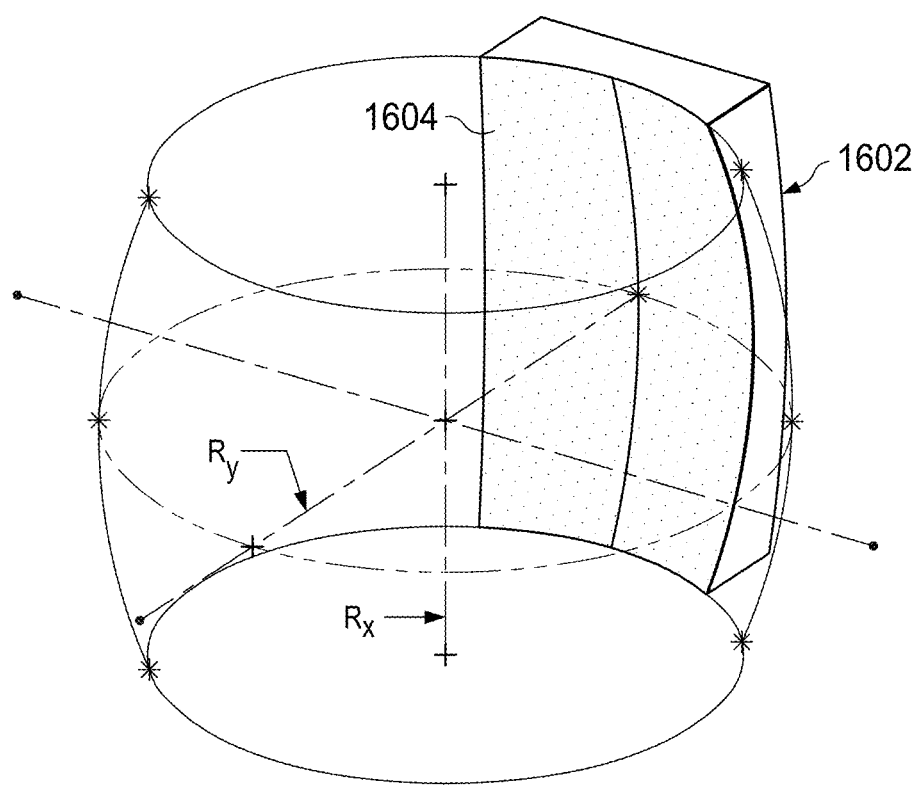
FIG. 16 is a schematic of an exemplary toroid where the inner shaded-portion of which can be the shape of either the first mirror, the second mirror, or both the first and second mirrors of the monolithic Offner spectrometers shown in FIGS. 1, 5 and 11 in accordance with an embodiment of the present invention.

Referring to FIG. 16, there is a schematic of an exemplary toroid 1602 where the inner shaded-portion 1604 of which can be the shape of either the first mirror 114/114'/114" or the second mirror 124/124'/124" or both the first and second mirrors 114/114'/114" and 124/124'/124". The use of toroidal first and second mirrors 114/114'/114" and 124/124'/124" permits better optical correction when compared to the use of spherical mirrors. The two common toroidal shapes are "footballs" and "doughnuts". The exemplary toroid 1602 shown is a "football" toroid where the longer radii (Ry) is revolved around the shorter radii (Rx) to generate the shape. Aspheric toroids are also possible where Ry as an example departs from a circle or an elliptical. Symmetry is not required for the shape of the first and second mirrors 114/114'/114" and 124/124'/124". Mathematically, a freeform is typically described in the art with a polynominal equation where terms to an "odd" power induce contributions that are negative on one side of an axis and positive of the opposite side of the same axis.

III. The Diffraction Grating 120/120'/120".

The monolithic Offner spectrometer 102/102'/102" can make use of a toroidal diffraction grating 120/120'/120" or a toroidal aspheric diffraction grating 120/120'/120" for aberration correction. The use of a toroidal diffraction grating 120/120'/120" or a toroidal aspheric diffraction grating 120/120'/120" in monolithic spectrometers has not been used in the past because of fabrication difficulties. However, the monolithic Offner spectrometer 102/102'/102" with the aid of a diamond machining process is able to utilize the toroidal diffraction grating 120/120'/120" (or toroidal aspheric diffraction grating 120/120'/120") without additional manufacturing cost (see FIG. 16 which illustrates an exemplary toroid shape)

Figure 17:
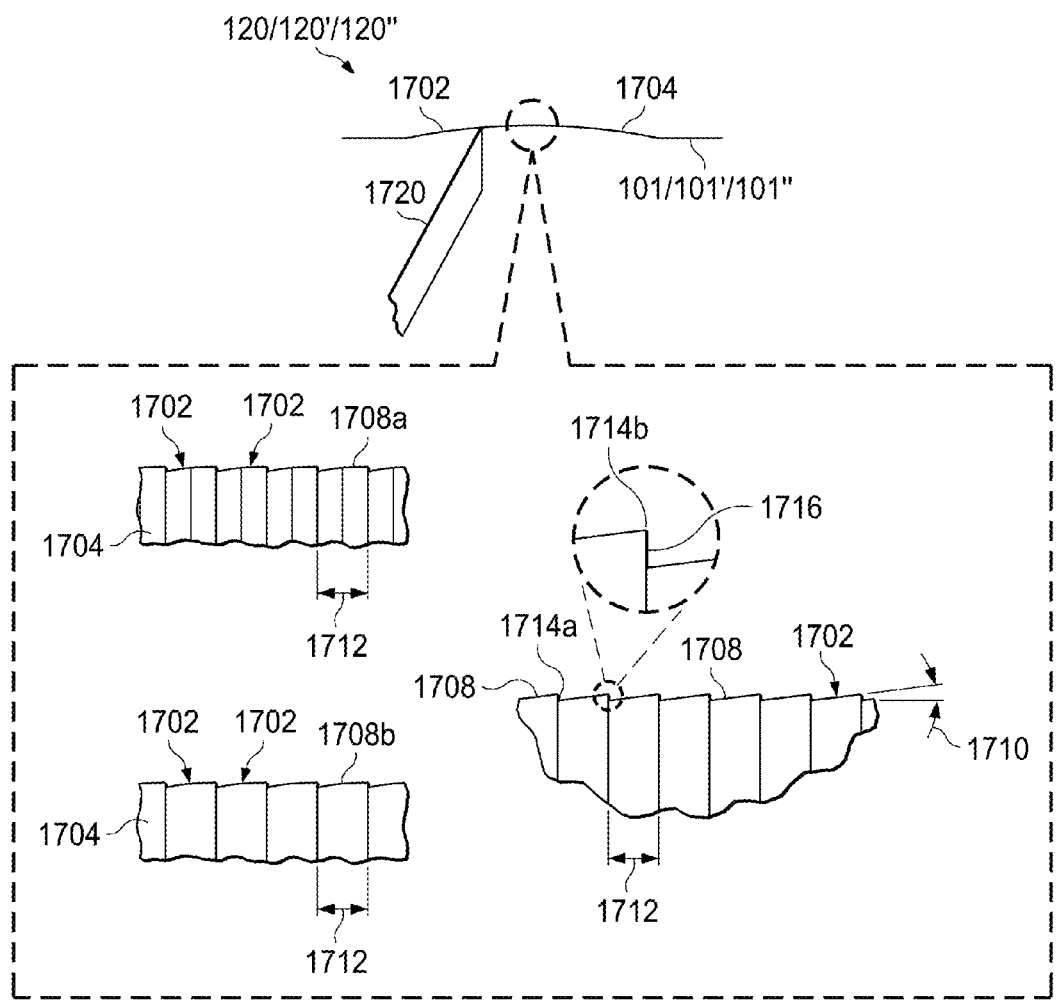
FIG. 17 is a detailed diagram of an exemplary diffraction grating of the monolithic Offner spectrometers shown in FIGS. 1, 5 and 11 in accordance with an embodiment of the present invention.

Referring to FIG. 17, there is a detailed diagram of an exemplary diffraction grating 120/120'/120" configured in accordance with an embodiment of the present invention. As shown, the diffraction grating 120/120'/120" has a large number of linear gratings 1702 which are formed within a powered surface 1704 (e.g., sphere surface 1704, toroid surface 1704, toroid aspheric surface 1704). Each linear grating 1704 has a blazed surface 1708 (or a dual facet blaze surface 1708a or powered blazed surface 1708b) which is tilted according to a blaze angle 1710 that varies across the powered surface 1704. The blaze angle 1710 is in a range of 0.1 to 20 degrees and is measured from the blaze facet to the local surface tangent. Each linear grating 1704 has a period 1712 which is defined by the distance between two ruled lines 1714a and 1714b. The period 1712 can be in the range of 0.0005 mm-5 mm. Each ruled line 1714a and 1714b has what is referred to herein as a blaze reset 1716. The blaze reset 1716 has a height in a range of 0.2 to 10 um. The blaze reset 1716 can be perpendicular from the blazed surface 1708 or can be oriented at an angle which is in a range of +/−20 degrees and measured from the blaze reset to the local surface normal. A discussion about how the diffraction grating 120/120'/120" can be diamond machined directly into the transmissive material 101/101'/101" is provided next with respect to FIG. 18.

Figure 18:
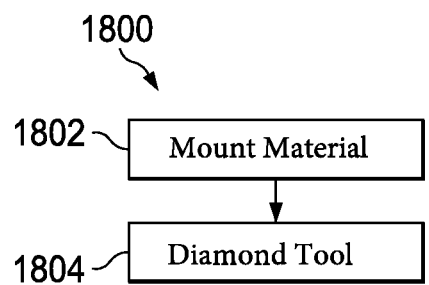
FIG. 18 is a flowchart that illustrates the steps of an exemplary method for diamond machining the diffraction grating directly into the transmissive material per the methods shown in FIGS. 2, 8 and 12 in accordance with an embodiment of the present invention.

Referring to FIG. 18, there is a flowchart that illustrates the steps of an exemplary method 1800 for diamond machining the diffraction grating 120/120'/120" directly into the transmissive material 101/101'/101" in accordance with an embodiment of the present invention (note: this is a more detailed discussion about one way to perform FIG. 2's step 208, FIG. 8's step 810 and FIG. 12's step 1210). At step 1802, the transmissive material 101/101'/101" is mounted and secured onto a CNC diamond turning machine. At step 1804, the CNC program controls the operation and movement of a diamond tool 1720 (which preferably has a radius that is smaller than the blaze reset 1716) through a path defined by the grating profile so as to form the linear gratings 1704 and the powered surface 1704 (curved surface 1704) (see FIG. 17). The variation in the blaze angle 1710 along the powered surface 1704 is also controlled by the CNC program. This process can be used to form grating periods 1712 which range from a few microns to a few millimeters.

In one embodiment, the diamond tool 1720 has a tip with a radius in the range of 0.5 microns to 20 microns. Because, the diamond tool's tip radius is very small, the CNC diamond turning machine needs to have a very slow feedrate to obtain the desired optical finish. Plus, the CNC diamond turning machine needs to operate at feedback resolutions of less than 10 nm. This type of manufacturing process can take a long time and as a result the uniformity of the grating period 1712 may become sensitive to the thermal stability of the CNC diamond turning machine. To address this concern, one could machine the blaze surface 1708/blaze angle 1710 first and then machine the blaze resets 1716 (which define the grating period 1712) using a separate more time efficient CNC program. If this is done, then the diffraction grating 120/120'/120" is going to have a surface finish which has a characteristic repetitive "fingerprint" with a roughness (Ra) of ~1 nm. The repetitive structure of this characteristic "fingerprint" is one way that could be used to determine if a diffraction grating happened to be manufactured in accordance with the present invention.

The manufactured diffraction grating 120/120'/120" and the manufacturing method 1800 described above have several desirable features and advantages, some of which are discussed next:

The manufacturing method 1800 can be used to produce either convex or concave surfaces which means that molds for replicating multiple monolithic Offner spectrometers 102/102'/102" incorporating the aforementioned diffraction gratings 120/120'/120" can be produced (e.g., see FIGS. 4, 10 and 14). This is desirable because a molded monolithic Offner spectrometers 120/120'/120" can be produced cost effectively and at the high volumes necessary for commercial applications.

The diffraction grating 120/120'/120" is mechanically and environmentally stable because it's profile is machined directly into the transmissive material 101/101'/101" or the mold 408, 1008 and 1408 (see FIGS. 4, 10 and 14).

The CNC program and small diamond tool 1720 work together to ensure that the variation in the blaze angle 1710 is machined to match the particular angle of incidence of the light at particular points on the powered surface 1704. This variation in the blaze angle 1710 improves the efficiency. In addition, this variation in the blaze angle 1710 is an additional degree of design freedom that could not be exploited in the past.

The blaze surface 1708 does not have to be a flat surface with a blaze angle 1710 that is optimized for one wavelength. Instead, the blaze surface 1708 can be faceted, or "powered" to optimize performance over an extended operational wavelength range. FIG. 17 illustrates an exemplary dual facet blaze surface 1708a and an exemplary powered blaze surface 1708b.

A designer can control the manufacturing process to vary the period 1712 in order to correct an optical aberration. Or, the designer can vary the period 1712 so they can use multiple apertures with different periods on a common substrate.

The blaze reset 1716 between two blaze surfaces 1708 can have an angle that varies similar to the variation in the blaze angle 1710. However, this is not a requirement with the present invention. The small diamond tool 1720 enables one to use the same point on the tool 1720 so they have the ability to vary the angle of the blaze reset 1716 at a different angle than the blaze angle 1710 associated with the blaze surfaces 1708. This is a marked improvement since in the past a relatively large tool would be used to form at the same time the blaze surface and blaze reset.

IV. The Transmissive Material 101/101'/101".

The type of transmissive material 101/101'/101" used to make the monolithic Offner spectrometer 102/102'/102" would effectively dictate the type of detector 106/106'/106" and in particular the wavelength (color) sensitivity of the detector 106/106'/106" used to generate the image of the remote object. For instance, if the monolithic Offner spectrometer 102/102'/102" was made from a plastic (e.g., polymethylmethacrylate (PMMA), polystyrene, polycarbonate) then the wavelength would be visible and the detector 106/106'/106" could be a complementary metal-oxide-semiconductor (CMOS) video camera 106/106'/106". If the monolithic Offner spectrometer 102/102'/102" was made from an infrared transmitting material (e.g., barium fluoride, silver chloride, or arsenic trisulfide), then the detector 106/106'/106" would be an infrared (IR) detector which could be based on mercury cadmium telluride (HgCdTe) or indium antimonite (InSb).

The infrared transmitting materials—barium fluoride, silver choride and arsenic trisulfide are desirable in this particular application because they are easily diamond turned with good dimensional stability, and have low surface wavefront errors, low surface roughness and a high fidelity which is useful when producing diffractive structures. In particular, barium fluoride is a very useful material for the monolithic Offner spectrometer 102/102'/102" because it has a wide range (0.38-12.0 um) of high transmission. The arsenic trisulfide has a narrower transmission range (0.68-11.0 um) but can be used to produce a more compact monolithic Offner spectrometer 102/102'/102" because of its high refractive index, n=2.45. The silver chloride also has a high index (n=2.00), and transmits into the far IR (0.5-22 um) which is useful in producing a compact monolithic Offner spectrometer 102/102'/102".

V. The Compact Configuration of the Monolithic Offner Spectrometer 102/102'/102"

The monolithic Offner spectrometer 102/102'/102" can be configured according to the following equation no. 1 and dimensions:

$$dx/d\lambda = f^* d\theta/d\lambda = f^*/(2^*(d/n)^*\cos(\Phi)^*\cos(\theta)) \quad (1)$$

where:
- $dx/d\lambda$ is a linear dispersion in a range of 4-200 mm/um;
- f is a focal length in a range of 10-300 mm which is measured from the diffraction grating 120/120'/120" to the focal plane detector 106/106'/106";
- d is the period of the linear gratings in a range of 3-1000 um;
- n is an order of diffraction in a range of 1-10;
- $\Phi$ is an Ebert angle in a range of 1-30° and is measured from incident to normal;
- $\theta$ is a diffracted angle in a range of 0.2-45° and is measured from incident to resulting diffracted order.

Figure 19:
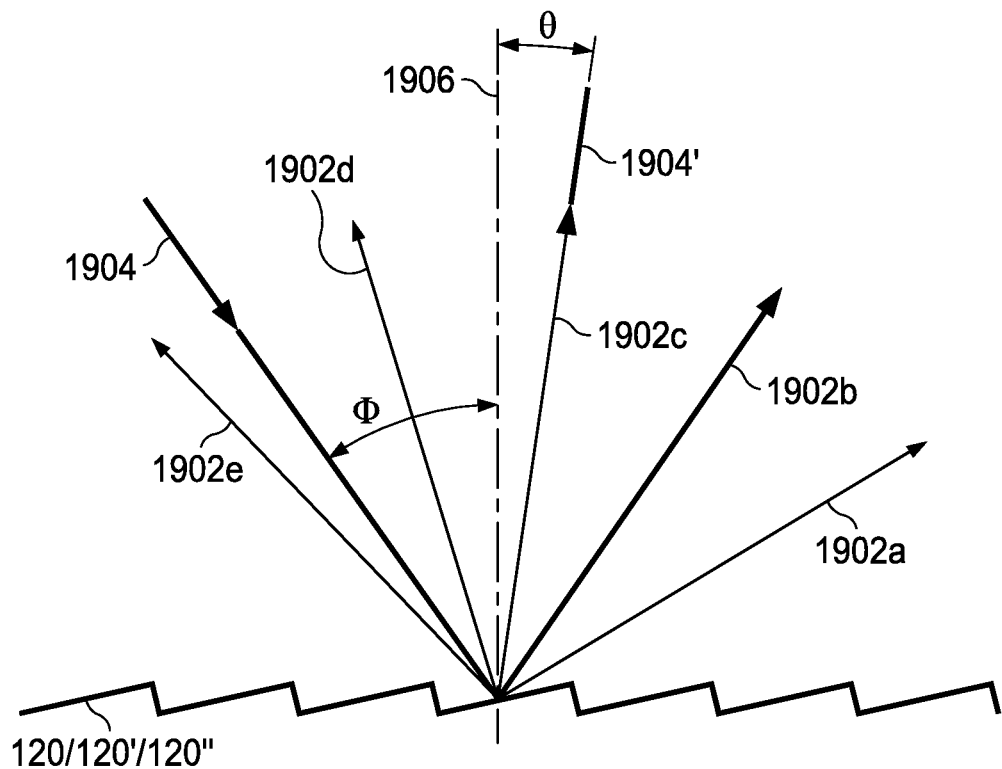
FIG. 19 is a detailed diagram illustrating light rays interacting with an exemplary diffraction grating in accordance with an embodiment of the present invention.

Referring to FIG. 19, there is shown a portion of the diffraction grating 120/120'/120" which is used to illustrate equation no. 1's Ebert angle $\Phi$, different orders of diffraction 1902a, 1902b, 1902c, 1902d and 1902e (for example), and the diffracted angle $\theta$. As shown, an incident beam 1904 is directed onto the diffraction grating 120/120'/120" and if there was no grating then the $0^{th}$ order (reflection) 1902b is where the reflected incident beam 1904' would travel. On the other hand, in the presence of a grating then the reflected incident beam 1904' would depending on the configuration of the grating travel on either the $-1^{st}$ order 1902a, the $1^{st}$ order 1902c, the $2^{nd}$ order 1902d, the $3^{rd}$ order 1902e etc. In this example, the reflected incident beam 1904' is shown travelling on the $1^{st}$ order 1902a 1902c. The Ebert angle $\Phi$ is shown as being measured from the incident 1904 to the normal-to-surface 1906. The diffracted angle $\theta$ is shown as measured from the normal-to-surface 1906 to the resulting diffracted order which in this example is the $1^{st}$ order 1902c.

If the monolithic Offner spectrometer 102/102'/102" is configured in accordance with the equation and associated dimensions then it would be considered to be a "compact" monolithic Offner spectrometer 102/102'/102". The "compact" monolithic Offner spectrometer 102/102'/102" made in accordance with the aforementioned dimensions as discussed next is an improvement over the traditional "compact" Offner spectrometers.

The traditional Offner spectrometers in order to achieve a large linear dispersion (dx/d$\lambda$) (e.g., 4-200 mm/um) with a larger focal length (f) (e.g., 50-1500 mm) would have a small grating period (e.g., 5-200 um). Such small grating periods are difficult to manufacture, and therefore the manufacturers had to replicate the diffraction grating in polymer and then attach to the replicated diffraction grating onto the monolith. This was problematic because of the index mismatch between the polymer and the monolith created stray reflections, and limited the spectral range due to the high absorption in the typical polymer.

In the new diffraction grating 120/120'/120", the grating period 1712 is large (e.g., 3-1000 μm) so that it can be easily manufactured by diamond turning directly into the transmissive material 101/101'/101" or replicating in the mold 408, 1008 and 1408, but the order of diffraction (e.g., 1-10) is selected so that (d/n) remains appropriately small. The profile of the grating grooves is designed to provide the desired grating efficiency at the selected order of diffraction.

VI. The Housing 107/107'/107".

A significant advantage of the "compact" monolithic Offner spectrometer 102/102'/102" in the infrared (IR) is that the small size allows it to be incorporated into a standard detector Dewar 107/107'/107" (housing 107/107'/107"). In the past, a modified Dyson spectrometer has been incorporated into a standard detector Dewar, but the "compact" monolithic Offner spectrometer 102/102'/102" is superior because the monolithic design makes it temperature independent, and it does not need the anti-reflection (AR) coatings that are required to avoid stray light in the Dyson design.

Although multiple embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A hyperspectral imaging system for imaging a remote object, the hyperspectral imaging system comprising:
   a housing;
   fore optics, attached to the housing, where the fore optics are configured to receive a beam from the remote object;
   a detector attached to the housing; and
   a monolithic Offner spectrometer positioned inside the housing, the monolithic Offner spectrometer comprising:
      a transmissive material which has:
         an entrance surface which has an opaque material applied thereto, where the opaque material has an opening therein which forms a slit that is configured for receiving and passing a portion of a beam received from the fore optics;

a first surface which has a first reflective coating applied thereto to form a first mirror, where the first mirror is configured for receiving and reflecting the beam that passed through the slit;

a second surface which has a second reflective coating applied thereto to form a diffraction grating, where the diffraction grating is configured for receiving, diffracting and reflecting the beam received from the first mirror;

a third surface which has a third reflective coating applied thereto to form a second mirror, where the second mirror is configured for receiving and reflecting the diffracted beam received from the diffraction grating; and an exit surface for passing there through the diffracted beam reflected from the second mirror to the detector;

where the monolithic Offner spectrometer is configured according to:

$$dx/d\lambda = f * d\theta/d\lambda = f*/(2*(d/n)*\cos(\phi)*\cos(\theta))$$

where:

dx/dλ is a linear dispersion in a range of 4-200 mm/μm;

f is a focal length in a range of 10-300 mm which is measured from the diffraction grating to the focal plane detector;

d is the period of the linear gratings in a range of 3-1000 μm;

n is an order of diffraction in a range of 1-10;

φ is an Ebert angle in a range of 1-30° and is measured from incident to normal;

θ is a diffracted angle in a range of 0.2-45° and is measured from normal to diffracted order.

2. The hyperspectral imaging system of claim 1, wherein the transmissive material further includes a fourth surface which has a fourth reflective coating applied thereto to form a first fold mirror, where the first fold mirror is positioned with respect to the slit and the first mirror so as to receive the beam that passed through the slit and reflect the received beam towards the first mirror.

3. The hyperspectral imaging system of claim 2, wherein the transmissive material further includes a fifth surface which has a fifth reflective coating applied thereto to form a second fold mirror, where the second fold mirror is positioned with respect to the second mirror and the exit surface so as to receive the diffracted beam from the second mirror and reflect the received diffracted beam towards the exit surface.

4. The hyperspectral imaging system of claim 1, where the housing is a detector dewar.

5. The hyperspectral imaging system of claim 1, where the first mirror is a spherical mirror, a toroidal mirror, a toroidal aspheric mirror, or a freeform mirror.

6. The hyperspectral imaging system of claim 1, where the transmissive material is selected from barium fluoride, silver chloride, or arsenic trisulfide.

7. The hyperspectral imaging system of claim 1, where the opaque material, the first reflective coating, the second reflective coating, and the third reflective coating are a same material.

8. The hyperspectral imaging system of claim 7, where the same material is one of aluminum, gold, silver, or nickel.

9. A monolithic Offner spectrometer, comprising:

a transmissive material which has:

an entrance surface which has an opaque material applied thereto, where the opaque material has an opening therein which forms a slit configured for receiving and passing a portion of a beam;

a first surface which has a first reflective coating applied thereto to form a first mirror, where the first mirror is configured for receiving and reflecting the beam that passed through the slit;

a second surface which has a second reflective coating applied thereto to form a diffraction grating, where the diffraction grating is configured for receiving, diffracting and reflecting the beam received from the first mirror;

a third surface which has a third reflective coating applied thereto to form a second mirror, where the second mirror is configured for receiving and reflecting the diffracted beam received from the diffraction grating; and an exit surface for passing there through the diffracted beam reflected from the second mirror;

where the monolithic Offner spectrometer is configured according to:

$$dx/d\lambda = f * d\theta/d\lambda = f*/(2*(d/n)*\cos(\phi)*\cos(\theta))$$

where:

dx/dλ is a linear dispersion in a range of 4-200 mm/μm;

f is a focal length in a range of 10-300 mm which is measured from the diffraction grating to the focal plane detector;

d is the period of the linear gratings in a range of 3-1000 μm;

n is an order of diffraction in a range of 1-10;

φ is an Ebert angle in a range of 1-30° and is measured from incident to normal;

θ is a diffracted angle in a range of 0.2-45° and is measured from normal to diffracted order.

10. The monolithic Offner spectrometer of claim 9, wherein the transmissive material further includes a fourth surface which has a fourth reflective coating applied thereto to form a first fold mirror, where the first fold mirror is positioned with respect to the slit and the first mirror so as to receive the beam that passed through the slit and reflect the received beam towards the first mirror.

11. The monolithic Offner spectrometer of claim 10, wherein the transmissive material further includes a fifth surface which has a fifth reflective coating applied thereto to form a second fold mirror, where the second fold mirror is positioned with respect to the second mirror and the exit surface so as to receive the diffracted beam from the second mirror and reflect the received diffracted beam towards the exit surface.

12. The monolithic Offner spectrometer of claim 9, where the first mirror is a spherical mirror, a toroidal mirror, a toroidal aspheric mirror, or a freeform mirror.

13. The monolithic Offner spectrometer of claim 9, where the transmissive material is selected from barium fluoride, silver chloride, or arsenic trisulfide.

14. The monolithic Offner spectrometer of claim 9, where the opaque material, the first reflective coating, the second reflective coating, and the third reflective coating are a same material.

15. The monolithic Offner spectrometer of claim 14, where the same material is one of aluminum, gold, silver, or nickel.

* * * * *

UNITED STATES PATENT AND TRADEMARK OFFICE
CERTIFICATE OF CORRECTION

| | |
|---|---|
| PATENT NO. | : 9,435,689 B2 |
| APPLICATION NO. | : 14/048518 |
| DATED | : September 6, 2016 |
| INVENTOR(S) | : Lovell Elgin Comstock, II et al. |

It is certified that error appears in the above-identified patent and that said Letters Patent is hereby corrected as shown below:

In the Specification

Column 1, Line 8, after "benefit" insert -- of --.

Signed and Sealed this
Second Day of August, 2022

Katherine Kelly Vidal
Director of the United States Patent and Trademark Office